(12) United States Patent
Moghe et al.

(10) Patent No.: US 11,021,074 B2
(45) Date of Patent: Jun. 1, 2021

(54) PRECISION COIL ALIGNMENT TECHNIQUES FOR VEHICLE WIRELESS POWER TRANSFER

(71) Applicant: Cisco Technology, Inc., San Jose, CA (US)

(72) Inventors: Ashok Krishnaji Moghe, Pleasanton, CA (US); John George Apostolopoulos, Palo Alto, CA (US); Charles Calvin Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 46 days.

(21) Appl. No.: 16/011,935

(22) Filed: Jun. 19, 2018

(65) Prior Publication Data

US 2019/0381891 A1 Dec. 19, 2019

(51) Int. Cl.
*H02J 7/00* (2006.01)
*B60L 53/38* (2019.01)
*H02J 50/10* (2016.01)
*G06N 20/00* (2019.01)

(52) U.S. Cl.
CPC ............. *B60L 53/38* (2019.02); *G06N 20/00* (2019.01); *H02J 50/10* (2016.02)

(58) Field of Classification Search
CPC .......... B60L 53/38; B60L 53/36; B60L 53/35; B60L 53/12; H02J 50/10; H02J 50/80; H02J 50/90
USPC .......................................... 320/108; 307/104
See application file for complete search history.

(56) References Cited

U.S. PATENT DOCUMENTS

| | | | |
|---|---|---|---|
| 5,821,731 A | * | 10/1998 | Kuki ...................... B60L 53/36 320/108 |
| 9,463,706 B2 | | 10/2016 | Bell et al. |
| 2012/0262002 A1 | * | 10/2012 | Widmer ................. H02J 50/12 307/104 |

(Continued)

FOREIGN PATENT DOCUMENTS

WO    WO-2017165549 A1    9/2017

OTHER PUBLICATIONS

Gao, et al., "3-D Coil Positioning Based on Magnetic Sensing for Wireless EV Charging", IEEE Transactions on Transportation Electrification (vol. 3, Issue: 3, Sep. 2017), pp. 578-588, 2017, IEEE.

(Continued)

*Primary Examiner* — Zixuan Zhou
(74) *Attorney, Agent, or Firm* — Behmke Innovation Group LLC; Kenneth J. Heywood; James J. Wong

(57) ABSTRACT

In one embodiment, a device obtains sensor data indicative of three dimensional (3-D) orientations of primary and secondary wireless power transfer (WPT) charging coils. The secondary coil is mounted to a vehicle and the primary coil provides charge to the secondary coil during charging. The device detects misalignment between the primary and secondary WPT coils based on the sensor data. The device determines a coil alignment correction to offset the detected misalignment. The device sends control commands to one or more actuators to implement the coil alignment correction by moving one or more of the coils, either directly (e.g., via directly-coupled actuators) or indirectly (e.g., via the suspension of a vehicle).

20 Claims, 18 Drawing Sheets

(56) References Cited

U.S. PATENT DOCUMENTS

2015/0042168 A1* 2/2015 Widmer .............. B60L 53/305
                                                            307/104
2017/0001527 A1* 1/2017 Prokhorov ............. B60L 53/65
2017/0111088 A1   4/2017 Seong et al.

OTHER PUBLICATIONS

Gao, Yabiao., "Frequency Control, Modeling, Alignment Adaptation, and Safety Concerns for the Wireless Charging of Electric Vehicles", A Dissertation Submitted to the Graduate Faculty of The University of Georgia in Partial Fulfillment of the Requirements for the Degree, 161 pages, 2016, The University of Georgia.

Hwang, et al., "An Autonomous Coil Alignment System for the Dynamic Wireless Charging of Electric Vehicles to Minimize Lateral Misalignment", Energies 2017, 10, 315, www.mdpi.com/journal/energies, doi:10.3390/en10030315, 20 pages, 2017, MDPI.

Liu, et al., "A method for aligning of transmitting and receiving coils of electric vehicle wireless charging based on binocular vision", 2017 IEEE Conference on Energy Internet and Energy System Integration (EI2), Beijing, 2017, pp. 1-6, IEEE.

* cited by examiner

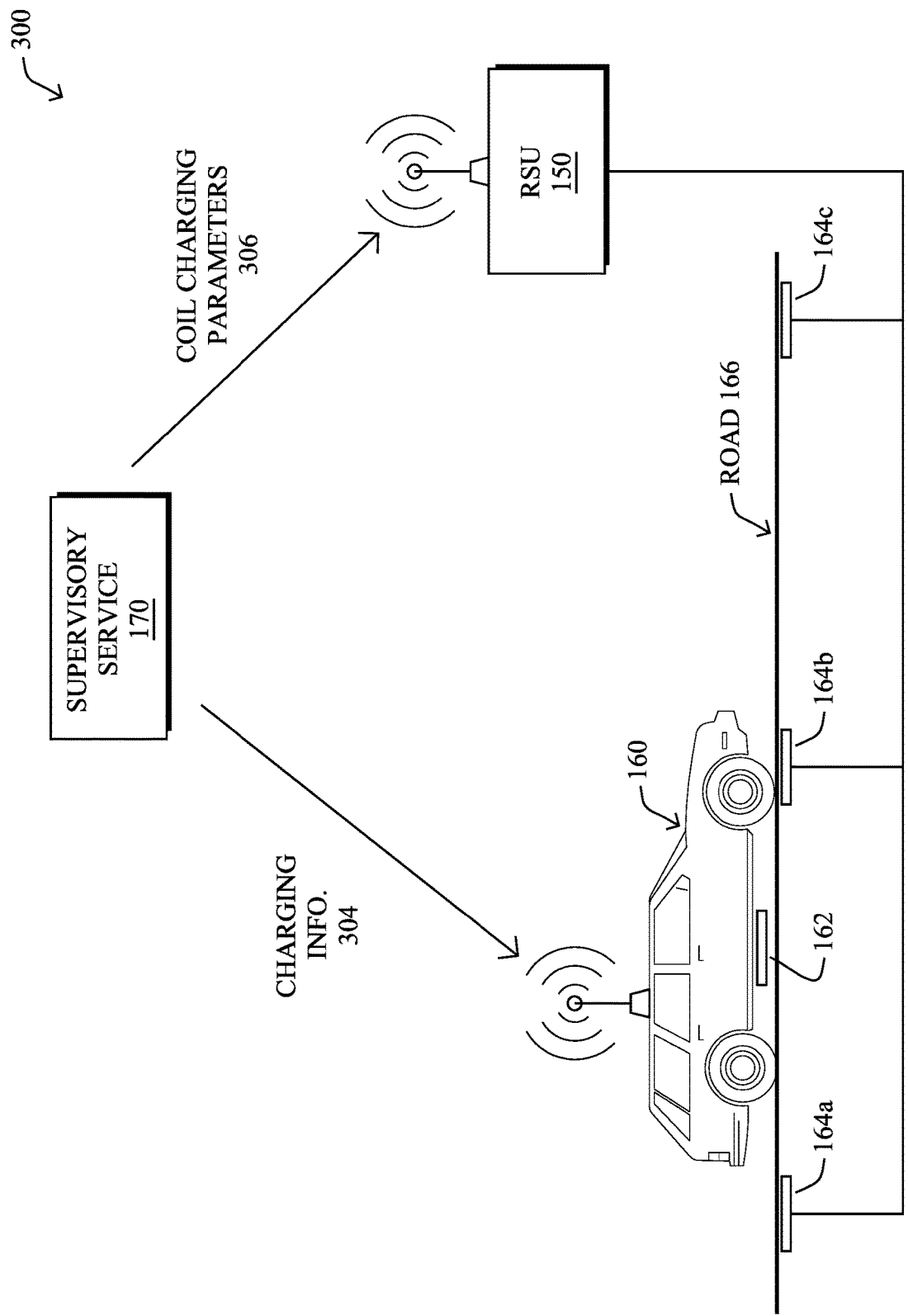

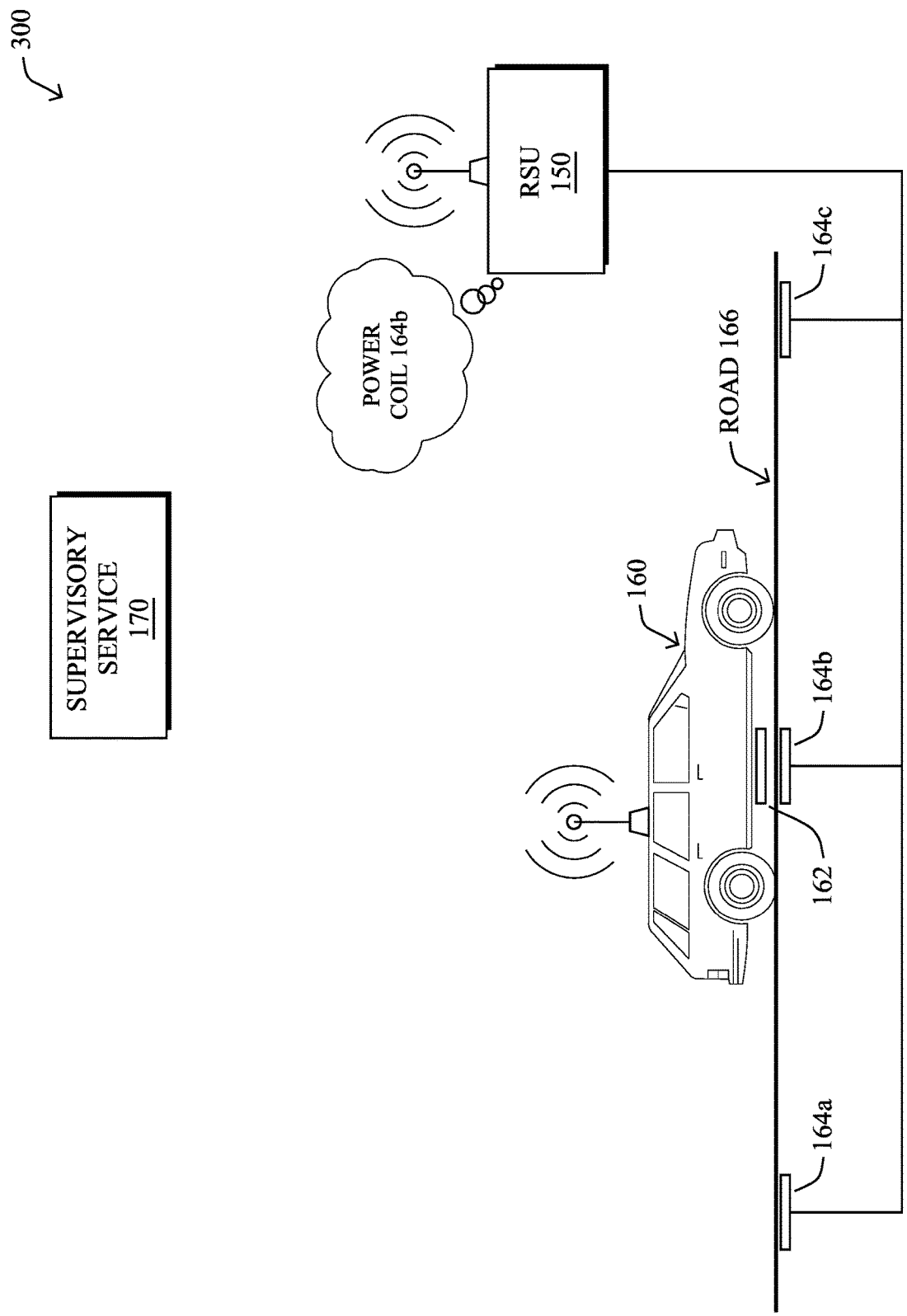

PRECISION COIL ALIGNMENT TECHNIQUES FOR VEHICLE WIRELESS POWER TRANSFER

TECHNICAL FIELD

The present disclosure relates generally to smart transportation systems, and, more particularly, precision coil alignment techniques for vehicle wireless power transfer.

BACKGROUND

Wireless power transfer (WPT) has proven to be viable for charging electric vehicles (EVs). In a typical WPT setup for EVs, a ground-based coil is supplied power, thereby inducing a current remotely in a second, vehicle-based coil located at the bottom of the EV. However, the alignment and air gap between the ground-based coil and the vehicle-based coil greatly affects the efficiency of power transfer. Various vehicle conditions can affect the alignment of the charging coil including, but not limited to, the following: 1.) the number of passengers or amount of load in the vehicle, which can cause it to sag unevenly, 2.) uneven tire inflation, 3.) uneven wear & tear of tires, and 4.) uneven wear and tear of shocks and struts of the vehicle, as well as other factors. Pavement conditions such as subsidence or potholes can also contribute to coil misalignment.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3D illustrate an example of powering a ground-based charging coil for an upcoming vehicle;

DESCRIPTION OF EXAMPLE EMBODIMENTS

Overview

Figure 1A:
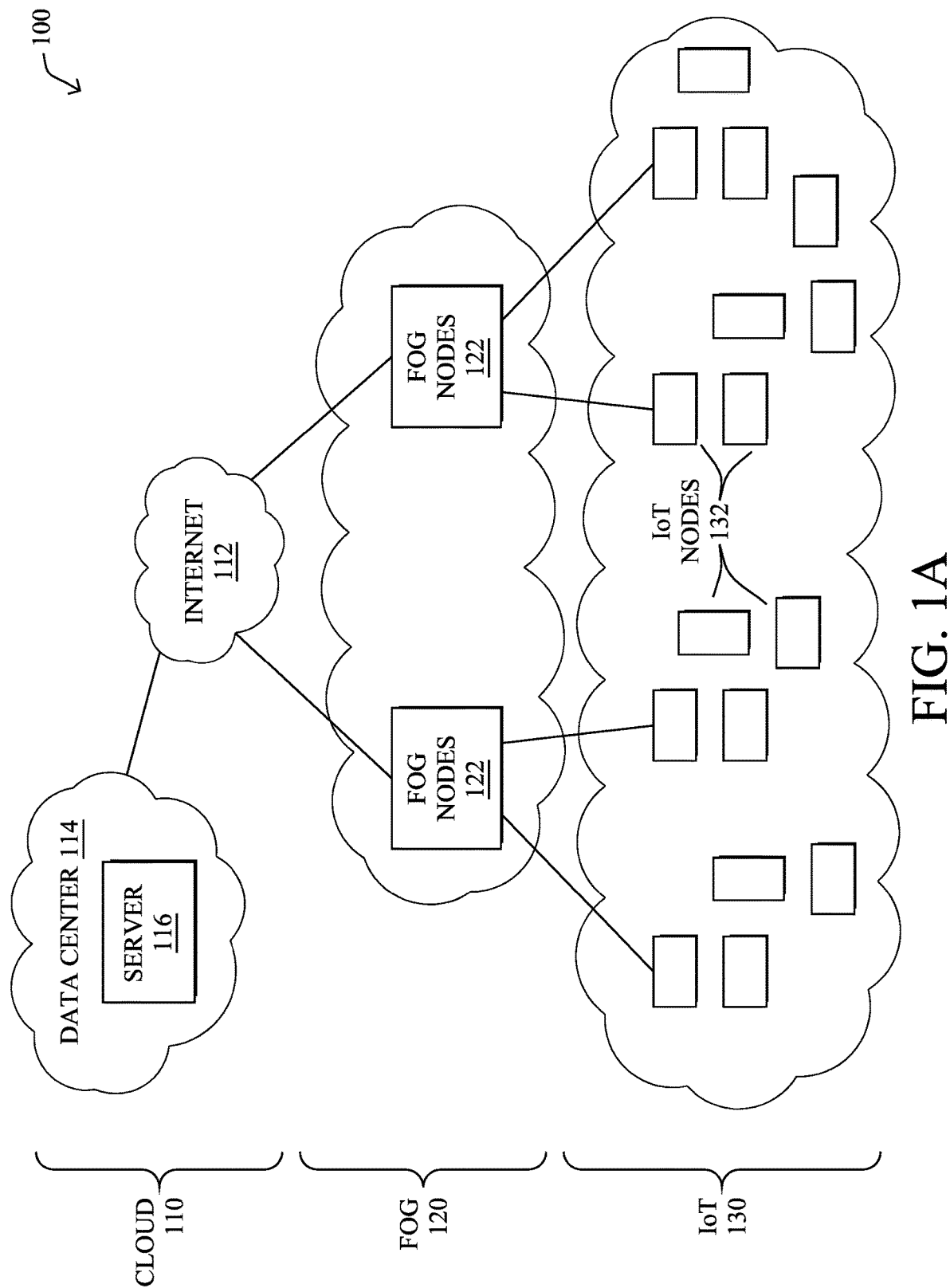
FIGS. 1A-1B illustrate an example communication network.

According to one or more embodiments of the disclosure, a device obtains sensor data indicative of three dimensional (3-D) orientations of primary and secondary wireless power transfer (WPT) charging coils. The secondary coil is mounted to a vehicle and the primary coil provides charge to the secondary coil during charging. The device detects misalignment between the primary and secondary WPT coils based on the sensor data. The device determines a coil alignment correction to offset the detected misalignment. The device sends control commands to one or more actuators to implement the coil alignment correction by moving one or more of the coils.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, Power Line Communications (PLC) protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
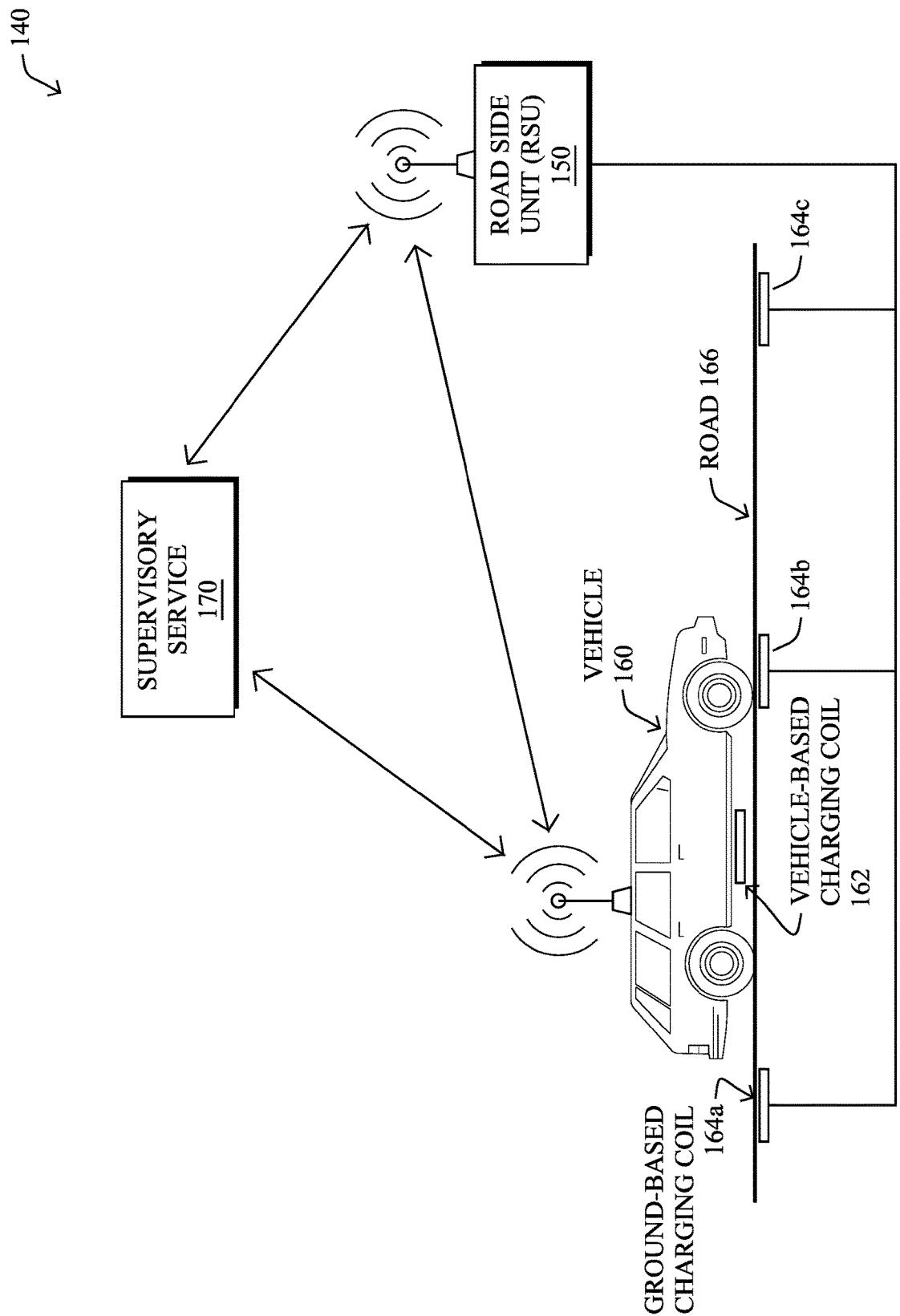

FIG. 1B illustrates an example wireless power transfer (WPT) system 140, according to various embodiments. In particular, WPT system 140 may include any or all of the following components: a vehicle 160, a roadside unit (RSU) 150, one or more ground-based charging coils 164, and/or a remote supervisory service 170. During operation, WPT system 140 may be operable to provide electrical charge to a local battery of vehicle 160, which may itself be an electric vehicle (e.g., either a fully-electric or hybrid electric vehicle).

In some embodiments, WPT system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, RSU 150 may be a fog node 122 at fog computing layer 120, while vehicle 160 may be viewed as an IoT node 132 at IoT layer 130. Thus, vehicle 160 may communicate directly with RSU 150, and/or via other IoT nodes 132 (e.g., other vehicles, roadside sensors, etc.), and RSU 150 may provide some degree of processing or storage over the communicated data.

RSU 150 may communicate with supervisory service 170 via a WAN, such as the Internet 112 or another WAN. For example, RSU 150 may communicate with supervisory service 170 by leveraging a hardwired network connection, cellular or other wireless connection, satellite connection, or the like. Communications between vehicle 160 and RSU 150 may generally be wireless and use any form of known wireless communication (e.g., Wi-Fi, cellular, light-based, etc.).

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, processors controlling vehicle body functions, and the like. A local gateway of vehicle 160 may provide communicative connectivity between the local network of vehicle 160 and other devices. For example, the local gateway of vehicle 160 may provide wireless connectivity to RCU 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

In various embodiments, vehicle 160 may comprise one or more vehicle-based charging coils 162 that are electronically coupled to the battery of vehicle 160. In addition, as shown, any number of ground-based charging coils 164 may be located along road 166, such as embedded into road 166. For example, ground-based charging coils 164a-164c may be embedded into road 166 and wired to RSU 150 that provides control over the powering of ground-based charging coils 164. For purposes of clarification, the term "ground-based charging coil" generally refers to the location of the charging coil (e.g., embedded into the ground) and is not intended to imply that a coil 164 acts an electrical ground. Also note that a ground-based coil is also sometimes referred to as a "primary coil" or "grid side coil."

During operation, ground-based charging coils 164 may be powered/energized, to charge the battery of vehicle 160. Notably, when vehicle-based charging coil 162 is located within proximity of a given ground-based charging coil 164, the powered coil 164 may inductively couple with vehicle-based charging coil 162. As a result, a current will be induced in vehicle-based charging coil 164, which can be used to restore charge to the battery of vehicle 160. Such charging may be performed when vehicle 160 is stationary or in motion, depending on the implementation. In addition, while ground-based charging coils 164 are shown as embedded into road 166, other implementations provide for coils 164 to be embedded into, or placed on, a parking lot, drive-thru, driveway, bus/taxi stop, or any other location at which vehicle 160 may be located.

Figure 2:
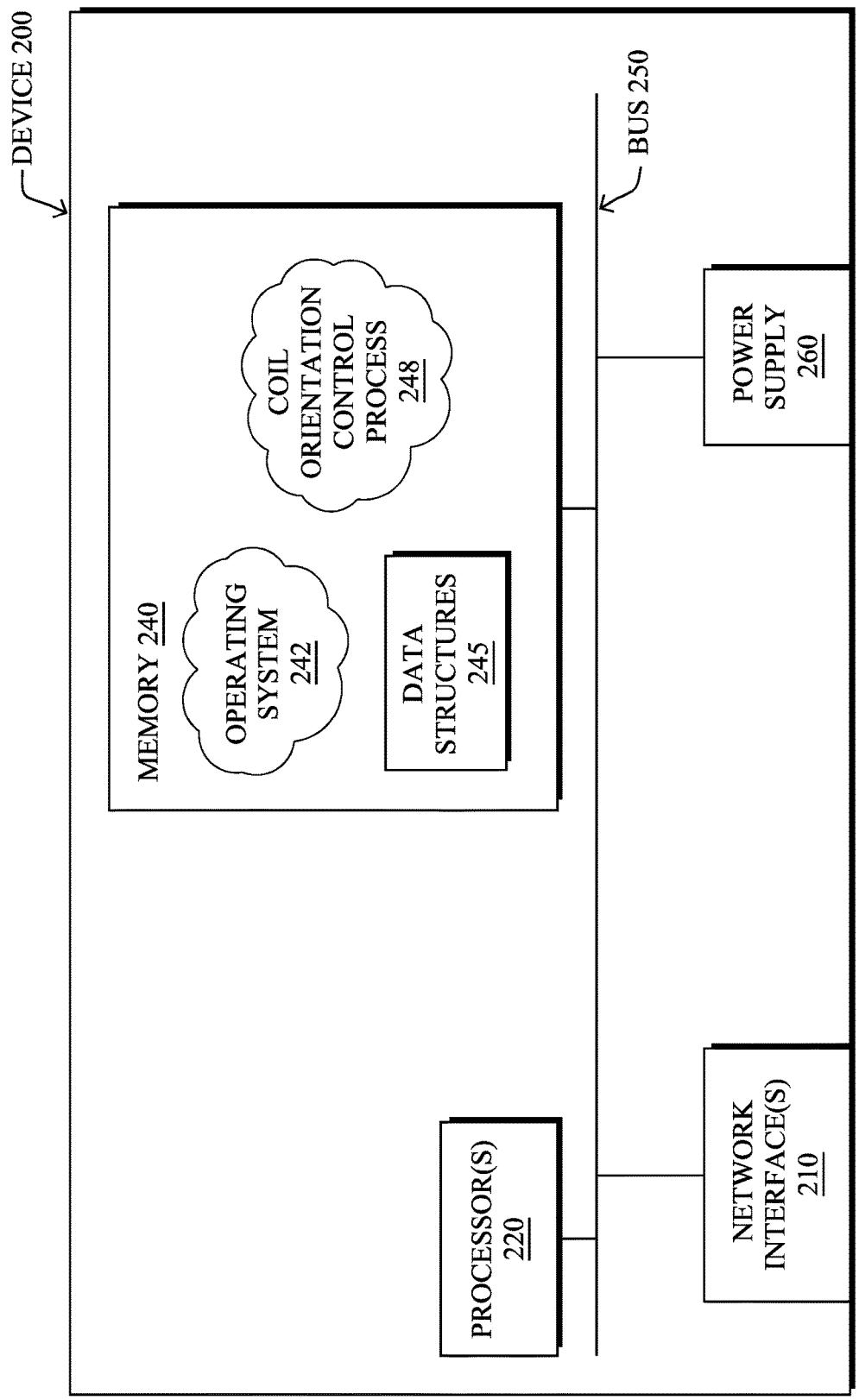
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative coil orientation control process 248, as described herein.

In general, coil orientation control process 248 may be configured to adjust the gap between wireless power transfer (WPT) coils for a vehicle charging system. In some embodiments, coil orientation control process 248 may do so by leveraging machine learning, to learn and adapt to the various characteristics of the vehicle and/or the ground-based charging coils. In general, machine learning is concerned with the design and the development of techniques that take as input empirical data (such as the height adjustment to either or both WPT charging coils, the provided charge, etc.), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, coil control process 248 may employ one or more supervised, unsupervised, or semi-supervised machine learning models. Generally, supervised learning entails the use of a training set of data, as noted above, that is used to train the model to apply labels to the input data. For example, the training data may include test results for different coil gaps and their associated amounts of charge conveyed to the vehicle. On the other end of the spectrum are unsupervised techniques that do not require a training set of labels. Notably, while a supervised learning model may look for previously seen patterns that have been labeled, as such, an unsupervised model may instead look to whether there are sudden changes in the behavior. Semi-supervised learning models take a middle ground approach that uses a greatly reduced set of labeled training data.

Example machine learning techniques that coil orientation control process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes, or operate concurrently.

As noted above, WPT is an emerging technology that has proven to be effective for charging electric vehicles (EVs). In a typical WPT setup for EVs, a ground-based coil is supplied AC power at a frequency related to the resonant frequencies of the system, thereby inducing a current remotely in a second, vehicle-based coil located at the bottom of the EV.

In a dynamic WPT scenario, a moving EV can travel over the ground-based coils where energy is transferred to the cars as they pass over the coils. To improve energy efficiency and/or keep the level of electromagnetic radiation low, some implementations may (only) energize the ground-based coils when the EV is on top of the coils. Note that superconducting coils could also be used, thereby lowering the energy loss, but these types of coils are unlikely to be used in typical implementations. In addition, regulating when the coils are energized could prevent heating issues, which could otherwise damage the infrastructure and lead to reliability issues.

FIGS. 3A-3D illustrate an example of powering a ground-based charging coil for an upcoming vehicle as part of a WPT system 300, according to various embodiments. Continuing the example of FIG. 1B, assume in FIG. 3A that vehicle 160 is in communication with supervisory service 170 and/or RSU 150 that are part of a vehicle WPT system. During operation, vehicle 160 may send data regarding the vehicle characteristics to service 170 and/or RSU 150 for further processing. Example vehicle characteristics 302 may include, but are not limited to, any or all of the following:

- A location of vehicle 160—for example, this information can include a Global Positioning System (GPS) coordinate from vehicle 160, navigation information from a subsystem of vehicle 160 (e.g., a vehicle navigation system), a signal that can be used to triangulate the location of vehicle 160, etc.
- A velocity of vehicle 160—this information can be used to determine whether vehicle 160 is stationary or in motion, as well as timing information, to determine when the charging coils of vehicle 160 are expected to be in close proximity to a particular one of the ground-based charging coils 164. If this information is not provided, it can be derived based on changes in the location of vehicle 160 over time.
- Acceleration information for vehicle 160—in some cases, vehicle 160 may also provide acceleration information as part of vehicle characteristics 302, such as from its accelerometer. If this information is not provided, it can be derived based on changes in the velocity of vehicle 160 over time.
- Make, model, and/or options of vehicle 160—this information can be used to determine the specific charging capabilities of vehicle 160 from the factory. For example, a certain manufacturer may offer upgraded charging systems on certain models over others (e.g., a larger capacity battery, a larger charging coil, etc.).
- Coil information for vehicle 160—this information may include data regarding the physical dimensions and position of vehicle-based charging coil 162 and/or the location of coil 162 on vehicle 160. For example, this information may indicate the size and/or shape of coil 162 (e.g., length and width measurements, if coil 162 is rectangular, a radius measurement, if coil 162 is circular, etc.). In another example, the coil information regarding coil 162 may indicate the distance between coil 162 and one or more sides of vehicle 160 (e.g., coil 162 may be ⅔ of the way from the front of vehicle 160, x-number of feet or inches from the passenger or driver's side of vehicle 160, etc.). This information can be used to indicate whether coil 162 is perfectly centered on vehicle 160 or, if not, its offsets from the center. In a further example, the information regarding coil 162 can also indicate the height or planarity of coil 162 relative to the ground (e.g., a height of M1 inches when vehicle 160 is not moving, a height of M2 inches when vehicle 160 is traveling at slow speeds, a height of M3 inches when vehicle 160 is traveling at highway speeds, etc.). In various embodiments, the coil information for vehicle 160 can also be retrieved (e.g., by service 170), based on the make, model, and/or options of vehicle 160.
- Age of vehicle 160—As noted above, battery life and charging capabilities of a vehicle can change over time. This information can be used to predict how much of a change is expected from that of the factory configuration. For example, this information may comprise the year in which vehicle 160 was made.
- Battery specifications of vehicle 160—if the battery cannot be identified, such as when the make/model of vehicle 160 is not available, vehicle 160 can nonetheless provide the specifications of its battery as part of vehicle characteristics 302, in some cases.
- Maintenance history of vehicle 160—For example, if the battery of vehicle 160 was replaced at some point in time, this information can be pertinent to determining the appropriate charging parameters for vehicle 160.
- Battery management system (BMS) data from vehicle 160—this data can include any information regarding the current and/or prior states of the battery of vehicle 160. For example, the BMS data may be indicative of the existing charge in the battery of vehicle 160, a history of charging of the battery of vehicle 160, the current battery temperature and/or surrounding temperature, or the like.
- Authentication information from vehicle 160—in the case where WPT charging is restricted, provided on a controlled basis (e.g., only to residents, only on a paid basis, etc.), or the like, this information can also be included in vehicle characteristics 302.
- Surrounding information regarding vehicle 160—further information regarding the surroundings of vehicle 160 may include, for example, information regarding other vehicles within proximity of vehicle 160. Such information may be obtained, for example, by cameras, LIDAR, radar, or other sensors that may be located on vehicle 160 or along road 166.
- Future energy requirements of vehicle 160—this may include any information indicative of the future energy requirements of the vehicle such as, but not limited to, navigation information (e.g., the number of miles until vehicle 160 reaches its destination), the planned driving speed of vehicle 160, the route that vehicle 160 will take to its destination and road condition information (e.g., whether there are hills, weather conditions such as snow, sleet, or rain, etc.), special vehicle conditions (e.g., whether vehicle 160 is towing a trailer, etc.), or the like.

As would be appreciated, any or all of the above vehicle characteristics 302 may be determined by vehicle 160 or, alternatively, by RSU 150 (e.g., based on sensor data from sensors of RSU 150, etc.).

In FIG. 3B, supervisory service 170 may use the received vehicle characteristics 302, to determine the appropriate coil charging parameters 306 for ground-based charging coils 164. Generally, coil charging parameters 306 may indicate which of ground-based charging coils 164 are to be powered, if any, when coils 164 should be powered, and the appropriate power level to be supplied. For example, based on the vehicle characteristics 302, supervisory service 170 may determine that the charging coil 162 of vehicle 160 will be in close proximity (e.g., less than several feet) with that of ground-based charging coil 164b at a time $t=t_1$. In addition, supervisory service 170 may determine that vehicle 160 requires charging, is authorized to charge, and/or an amount of power that should be delivered to the identified ground-based charging coil 164b. Note that in further embodiments, any or all of these determinations may be made at the fog layer, such as by RSU 150.

In case of dynamic WPT, supervisory service 170 may also communicate charging information 304 back to vehicle 160 regarding the charging process. For example, charging information 304 may include driving parameters while vehicle 160 is in motion (e.g., directing vehicle 160 to maintain a certain speed, stay in the current lane, etc.), confirmations or notifications regarding the charging, billing information, or the like.

In some embodiments, charging information 304 may include alignment information that can be used by vehicle 160 to ensure that vehicle-based charging coil 162 is properly aligned with ground-based charging coil 164, when vehicle 160 passes over coil 164. For example, charging information 304 may indicate to vehicle 160 the lane in which coil 164 is situated and potentially the proper position for vehicle 160 within that lane. In addition, service 170 may also determine the optimal lane position for vehicle 160 and include this in charging information 304, so as to maximize the transfer of power during charging by ground-based charging coil 164 (e.g., such that the overlap of coils 162 and 164 is maximized).

In situations when ground-based charging coil 164 is in the center of the lane and vehicle-based charging coil 162 is located at the center of vehicle 160 (e.g., in terms of side-to-side dimensions), then coil alignment is relatively easy and vehicle 160 simply needs to drive down the center of the lane. However, in many cases, ground-based charging coil 164 may be offset from the center of the lane (e.g., six inches to the right of lane center, etc.) or vehicle-based charging coil 162 may not be located centrally on vehicle 160 (e.g., four inches left of vehicle center, etc.). In such cases, including alignment information in charging information 304 allows vehicle 160 to be directed towards the proper lane and alignment, for maximum charging. For example, charging information 304 may indicate that vehicle 160 should drive ten inches to the right of lane center, to maximize the overlap, if coil 164 is six inches to the right of the center of the lane and coil 162 is four inches to the left of the center of vehicle 160. This relatively small change of ten inches may lead to a significant increase in the percentage of overlap between coils 162 and 164 and, therefore, the power transfer.

Implementation of the recommended lane and alignment can be achieved either autonomously, if vehicle 160 is so capable, or via feedback to the driver. For example, vehicle 160 may be equipped to translate charging information 304 into alerts for the driver of vehicle 160, such as voice alerts, video alerts (e.g., on a dash-based display), or even augmented reality alerts via a windshield-based display, to direct the driver to move vehicle 160 to a specific lane and/or how to position vehicle 160 within the lane.

In FIG. 3C, RSU 150 may provide power to ground-based charging coil 164b, based on coil charging parameters 306. For example, RSU 150 may cause ground-based charging coil 164b to be powered to a certain power level, in advance of vehicle 160 arriving at ground-based charging coil 164b. Thus, when vehicle-based charging coil 162 is within charging proximity of ground-based charging coil 164b, the two coils may inductively couple with one another, thereby transferring power to vehicle 160 that can be used to charge the battery of vehicle 160.

Figure 3A:
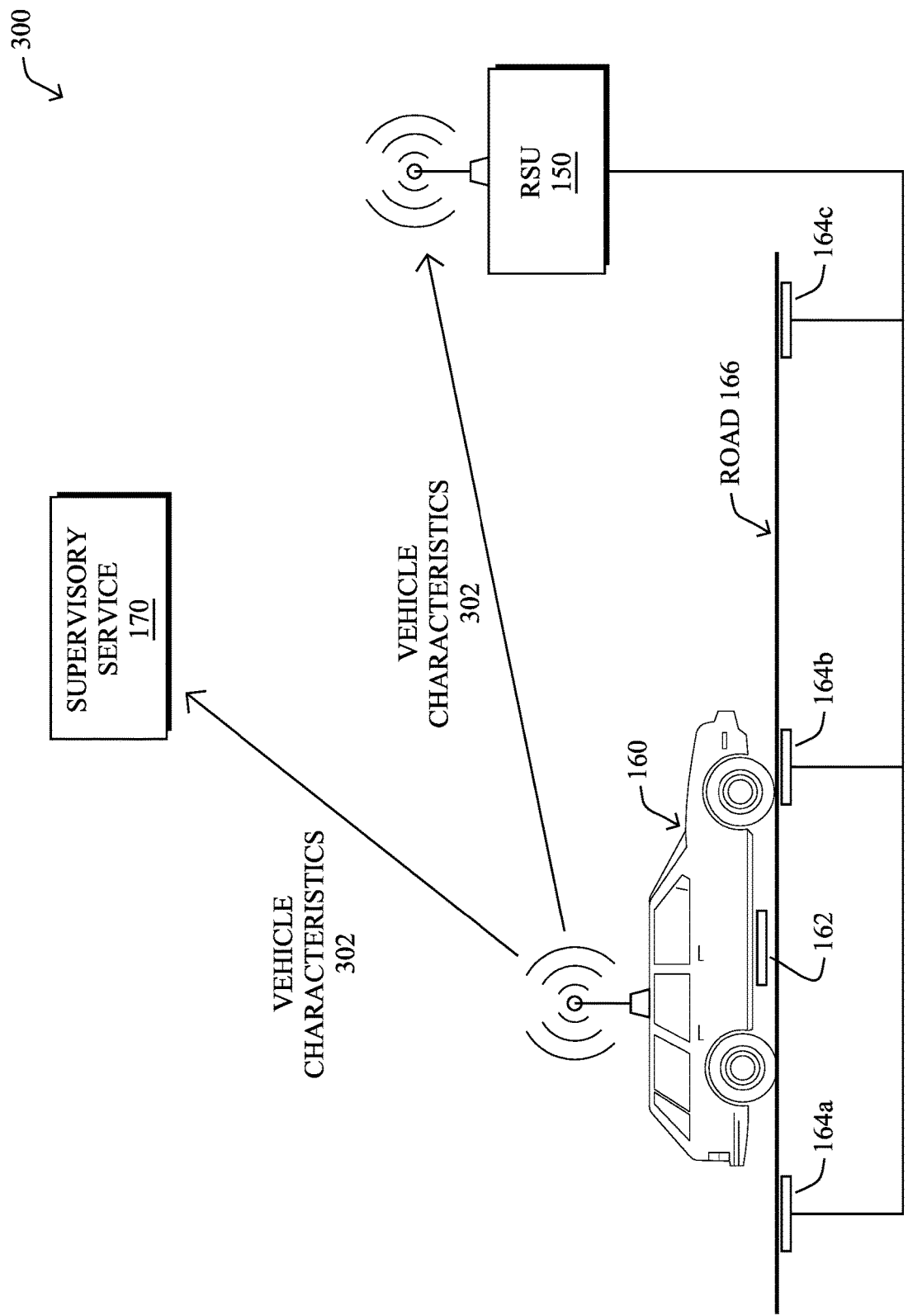
Figure 3D:
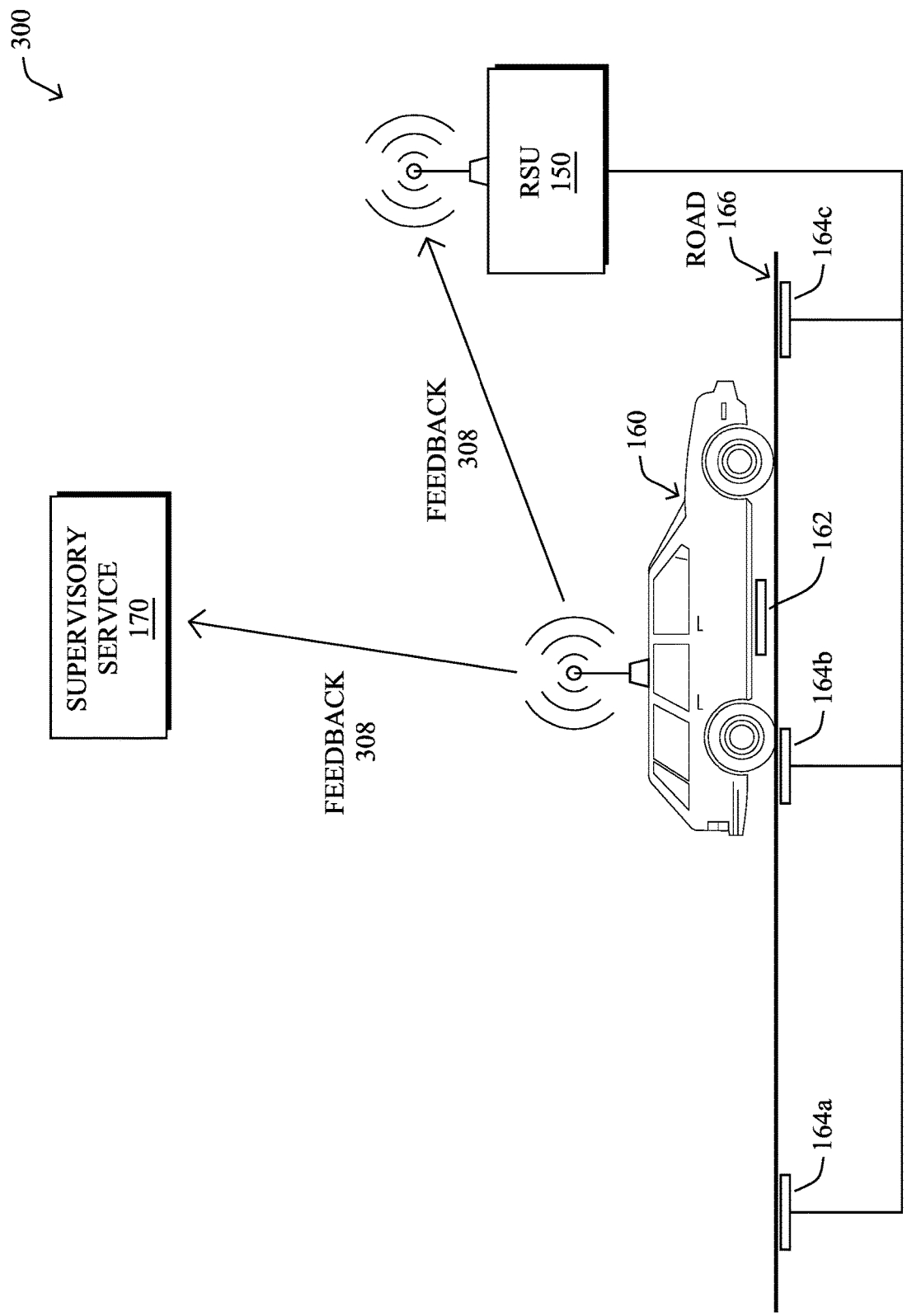

In FIG. 3D, vehicle 160 may also provide feedback 308 to supervisory service 170, and/or to RSU 150, regarding the charging from ground-based charging coil 164b. For example, feedback 308 may be indicative of the amount of charge that vehicle 160 was able to obtain from ground-based charging coil 164b, timing information in terms of the power transfer, or any other information regarding the charging operation. Such feedback can be used, in some embodiments, to update a machine learning model that seeks to optimize the power transfer process.

In various embodiments, WPT system 300 may be implemented for dynamic cases in which vehicle 160 is moving during charging and/or for static cases in which vehicle 160 is stationary. For example, in some cases, WPT system 300 can be implemented as part of a parking lot and, accordingly, ground-based charging coils 164 may correspond to different parking spots in which vehicle 160 can receive charging. In a further embodiment, any or all of charging coils 164 can be implemented as part of mobile robots that can be controlled (e.g., via signals from RSU 150) to first navigate within proximity of coil 162 of vehicle 160.

One factor that can greatly affect the amount of electrical power actually transferred to the vehicle is the alignment of the vehicle-based charging coil and the ground-based charging coil during the power transfer. In a typical vehicle scenario, the coil alignment can be affected by a number of conditions including, but not limited to:

the number of passengers or amount of load in the vehicle, which can cause it to sag unevenly;
uneven tire inflation;
uneven wear and tear of tires;
uneven wear and tear of shocks and struts of the vehicle;
improper coil installation by the manufacturer;
improper coil installation in the infrastructure (e.g., roads, pavement, parking garages and lots, etc.);
changes in the ground due to earth movements, seasonal changes, and the like (e.g., frost heaving, potholes, road surface wear, resurfacing, ice accumulation, etc.).

Furthermore, some of the factors mentioned above would cause a non-coplanar alignment of the coils. This means that the two coil faces may not be exactly parallel to one another. Even if the coil on the vehicle was initially perfectly horizontal at the time of mounting, the above factors can cause that perfectly horizontal alignment to change over time. In other words, the air gap may be larger on one side or corner and may be smaller on the other side or corner. Also, when the two planes of the coils are not parallel, the magnetic coupling between them is less than optimal, thereby reducing the efficiency of the power transfer. However, once installed, it is often very difficult to reorient a coil in a precise manner.

Precision Coil Alignment Techniques for Wireless Power Transfer

In certain aspects, the techniques introduced herein allow for the precise alignment and adjustment of charging coils in a vehicle WPT system. Doing so allows for the system to automatically correct for coil misalignment, thereby increasing the efficiency of the power transfer. The higher efficiency levels that can be achieved by the techniques herein are particularly important to infrastructure operators, such as parking lots, that operate multiple charging stations and are trying to optimize power transfer to maximize the speed of charging vehicles and to reduce cost/wasted energy. It is also important for indoor charging applications where waste heat would have to be removed by air conditioning systems.

Specifically, according to one or more embodiments of the disclosure as described in detail below, a device obtains sensor data indicative of three dimensional (3-D) orientations of primary and secondary wireless power transfer (WPT) charging coils. The secondary coil is mounted to a vehicle and the primary coil provides charge to the secondary coil during charging. The device detects misalignment between the primary and secondary WPT coils based on the sensor data. The device determines a coil alignment correction to offset the detected misalignment. The device sends control commands to one or more actuators to implement the coil alignment correction by moving one or more of the coils.

Illustratively, the techniques described herein may be performed by hardware, software, and/or firmware, such as in accordance with the illustrative coil orientation control process 248, which may include computer executable instructions executed by the processor 220 (or independent processor connected via interfaces 210) to perform functions relating to the techniques described herein.

Operationally, various techniques for adjusting the orientation(s) of vehicle-based and/or ground-based coils for vehicle WPT are introduced herein. Generally, as shown, a WPT vehicle, such as an automobile, motorcycle, truck, aircraft, autonomous drone, or any other type of vehicle configured to receive WPT power, may include at least one vehicle-based coil for power transfer to or from at least one ground-based coil. In addition, various types of adjustment systems, described in more detail below, may be used to control the gap between the coils in order to provide optimum power transfer. The adjustment system may be controlled via electronic communications (e.g., by instructions provided by a device in a network) to determine when the vehicle is within charging proximity and how to adjust the gap between the coils.

Figure 4:
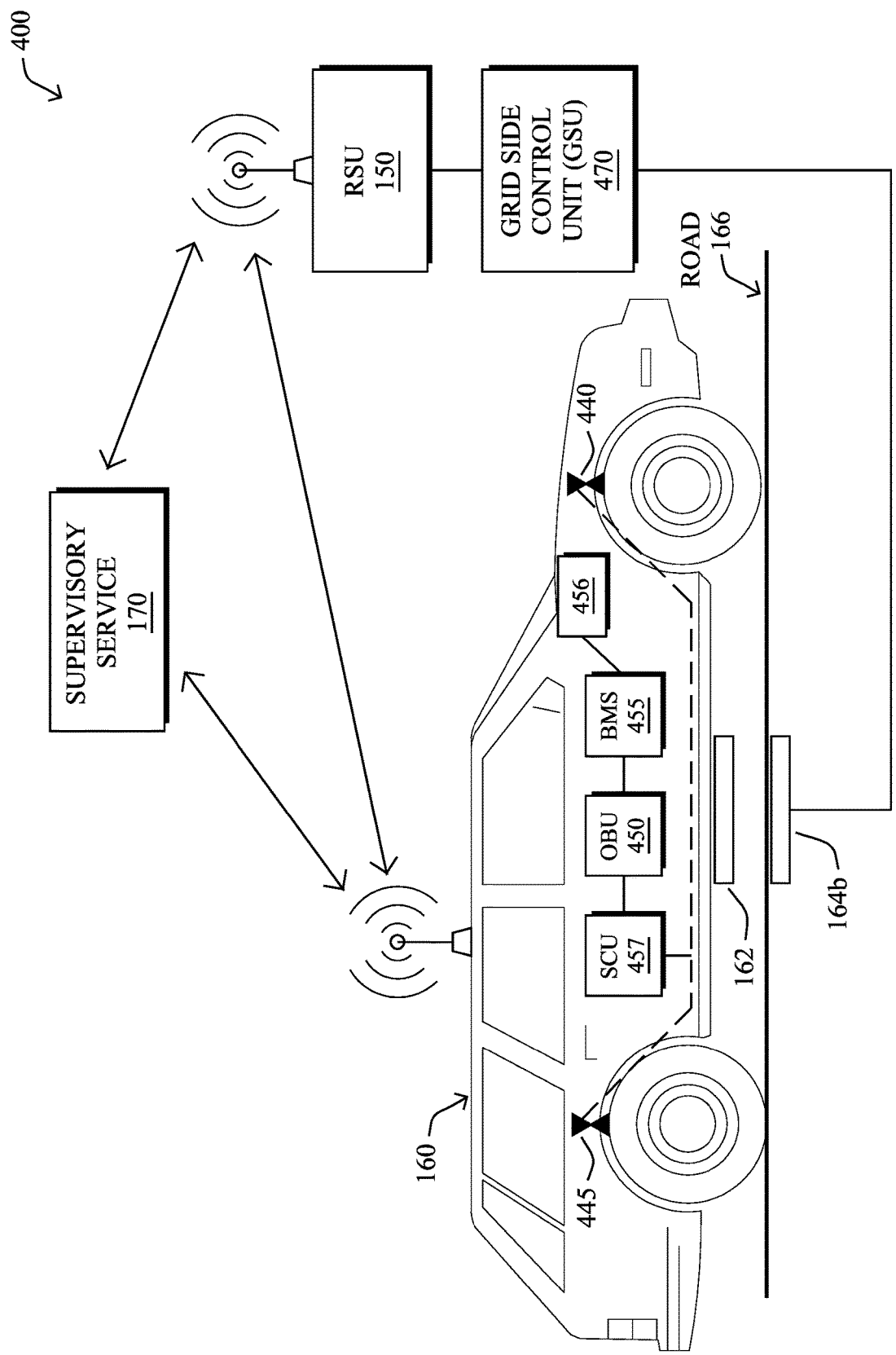
FIG. 4 illustrates an example of adjusting the suspension of a vehicle, to control WPT charging coil orientation.

FIG. 4 illustrates an example 400 of adjusting the suspension of a vehicle, to control WPT charging coil orientations, according to various embodiments. As described above, vehicle 160 may be in communication with RSU 150 and/or supervisory service 170, so that ground-based charging coil 164*b* is powered in advance of vehicle-based charging coil 162 coming within charging proximity of coil 164*b*. More specifically, based on the movement and/or predictive movement of vehicle 160, RSU 150 may send an indication of the appropriate charging information to a grid side control unit (GCU) 470 that powers ground-based charging coil 164*b*, accordingly. Note that GCU 470 may be integrated into RSU 150, in some implementations.

As shown, vehicle 160 may include a number of subsystems, to facilitate the transfer of power. For example, vehicle 160 may further comprise an On Board Unit (OBU) 450 that communicates with the other local systems of vehicle 160 and communicates with RSU 150 and/or supervisory service 170. In addition, vehicle 160 may include a Battery Management System (BMS) 455 that oversees the local battery 456 of vehicle 160 and regulates the charging thereof.

In various embodiments, OBU 450 may further be in communication with a local Suspension Control Unit (SCU) 457 of vehicle 160 that that provides control and adjustment of the vehicle suspension through adjustable suspension components 440 and 445 (e.g., adjustable shocks, struts, etc.). In other words, SCU 457 and adjustable suspension components 440-455 may operate as an adjustment system that adjusts the height of vehicle 160 and the plane of vehicle-based charging coil 162 relative to road 166.

The operation of the WPT system with respect to coil orientation control may proceed as follows:
1. As the power transfer operation begins, GSU 470 on the grid side may communicate with BMS 455 on vehicle 160 via the link between OBU 450 and RSU 150, to monitor the efficiency of the power transfer from ground-based coil 164*b* to vehicle-based charging coil 162.
2. GSU 470 compares the reported power transfer statistics from BMS 455 with a history (e.g., database) of available system-wide information regarding vehicle 160 or one or more other similar vehicles (e.g., in terms of make, model, options, version of WPT, etc.).
3. If GSU 470 determines that the power transfer efficiency deviates from an expected amount or range (e.g., based on previous charging operations or manufacturer's specifications), GSU 470 may predict non-coplanarity and/or a suboptimal air gap between coils 162 and 164*b*. Said differently, GSU 470 may determine an appropriate coil gap and/or planarity for coils 162, 164*b* that is predicted to increase the efficiency of the power transfer. As noted above, this determination may be made in the fog (e.g., on RSU 150 or GSU 470) or, alternatively, in the cloud (e.g., by supervisory device 170), and potentially by a machine learning-based process trained to determine the optimal coil configuration based on the various vehicle and/or road characteristics.

To begin with, the orientation of vehicle-based charging coil 162 can be detected through analysis of its equivalent of mechanical or electrical levels and/or via sensors local or remote to vehicle 160, as described in greater detail below. Based on this information, coil 162 can be adjusted so that it is parallel with the idealized ground (idealized because the ground and most specifically coil 164*b* in the ground may be tilted).

Tiny electronic magnetometers can be arranged around vehicle-based charging coil 162 and can estimate with high sensitivity the magnetic flux going through each of them. Each location may have 3 magnetometers oriented along the three primary axis (x-y-z) and used to detect the magnetic flux in each direction, in one embodiment. By looking at the readings around coil 162 (e.g., at four locations on vehicle 160 closest to the four wheels/suspensions) and the magnetic flux detected in each of the three directions at each location, GSU 470 can determine the orientation of coil 162 relative to ground-based charging coil 164*b*.

Note that the total flux at each location of the on-board coil may be different based on its relative position and orientation vs the primary (ground) coil. However, examining the flux in each direction (x-y-z) normalized by the total flux across all three directions, can overcome the effect of different total fluxes at each location.

4. The system can quickly achieve equilibrium since the power transfer efficiency can be calculated and monitored continuously. In other words, GSU 470 can assess the power transfer efficiency and the current orientation/height of coil 162 relative to road 166/coil 164*b*, and provide control commands to SCU 457 to adjust the height of vehicle 160 to effect an optimal coil gap between coils 162, 164*b*, as part of a closed loop control mechanism.
5. Also, by using the statistical guidance based on various factors such as make, model, option, version of WPT etc., from the global database of supervisory service 170, the system can guarantee a quick convergence instead of chasing a theoretical ideal number, which may never converge.
6. Furthermore, GSU 470 may add the best efficiency numbers achieved during the power transfer for the given conditions to the global database of supervisory system 170 for further use. This makes the system self-learning and thus continuously improving.

Note that the adaptive suspension adjustments may be applied in static WPT, quasi-static WPT, and dynamic WPT. In dynamic WPT, the movement of vehicle 160, and the angle of road 166 (e.g., flat or uphill or downhill) may lead to vehicle-based charging coil 162 and ground-based charging coil 164*b* to have a relative angle that exists for as long as the vehicle and ground are in the same relative situation (e.g., same speed, angle of ground, etc.). During this time, an adjustment of the coil 162 can lead to a beneficial improvement in coupling between the coils 162 and 164*b*.

In other words, before, or during, the transfer of power from ground-based charging coil 164*b* to vehicle-based charging coil 162, the system may send control commands to vehicle 160 that can be used by SCU 457 to adjust the height of vehicle 160 as a whole, adjust the height of vehicle 160 at individual corners of vehicle 160. For example, assume that adjustable suspension components 440 and 445 are currently configured such that coils 162 and 164*b* are separated by a coil gap of seven inches, but that the system determines that the optimal gap is six inches. In such a case, suspension components 440, 445 may be controlled (e.g., via SCU 457), to lower vehicle 160 by an inch.

In various embodiments, the adjustment of the coil orientation(s) can be performed predictively and/or adaptively. For example, the system may use machine learning to predict the coil orientation(s) that will optimize the power transferred from coil 164*b* to coil 162, such as by modeling prior power transfers to vehicle 160, itself, and/or to other vehicles of its kind. In addition, feedback can be used in real time, to adaptively control the gap during charging. In addition to the gap control (e.g., in the z-direction), the system can also control the orientation of the coil.

Figure 5:
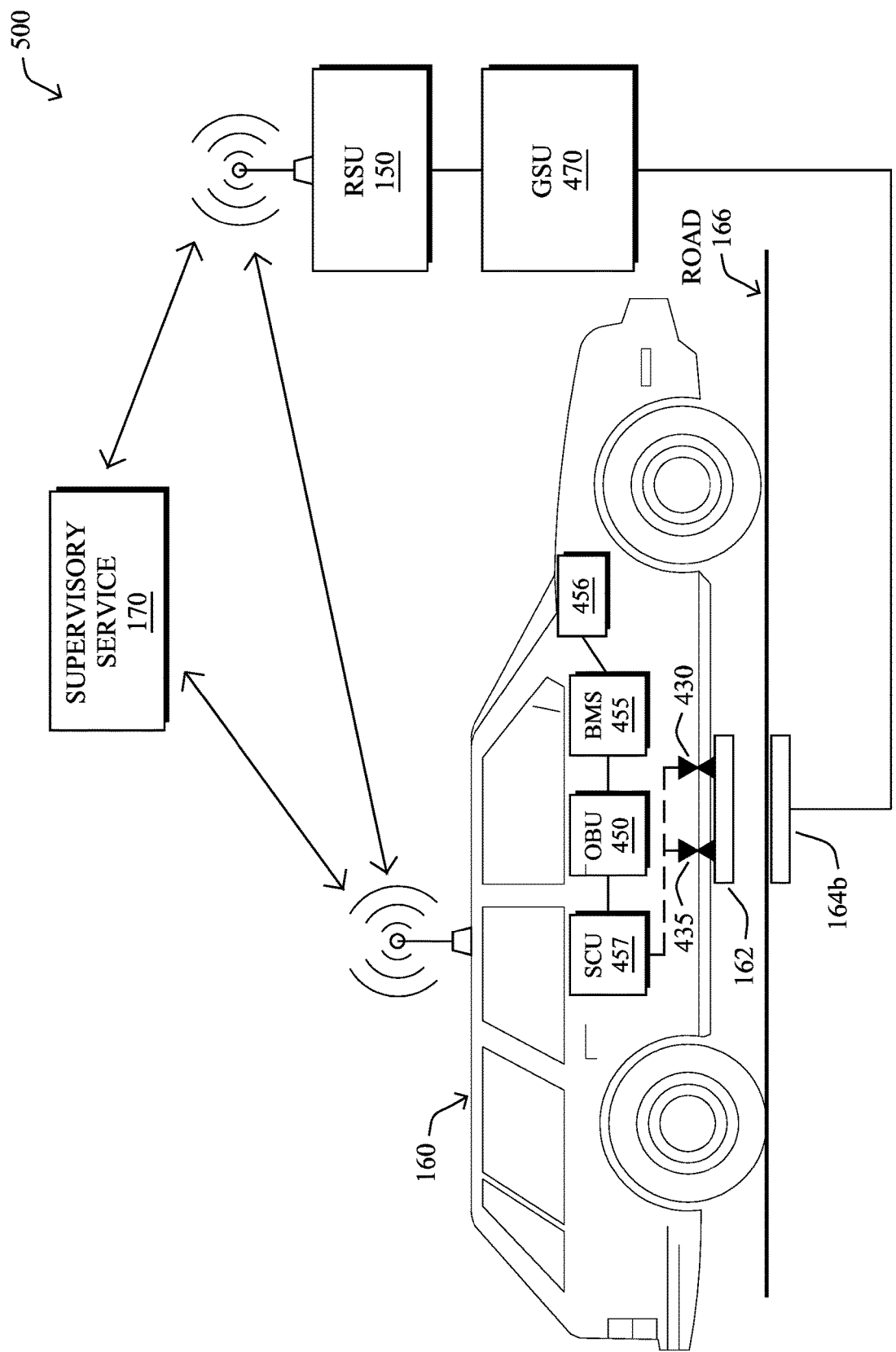
FIG. 5 illustrates an example of adjusting WPT vehicle-based charging coil orientation.

FIG. 5 illustrates another example of control over the gap between WPT charging coils. As shown, another possible coil adjustment system may comprise one or more adjustable members 430-435 that are coupled to vehicle-based charging coil 162 and controlled by SCU 457. In other words, vehicle-based charging coil 162 may be configured with its own adjustable suspension that can be controlled to adjust the gap between coil 162 and ground-based charging coil 164*b*.

Any suitable form of adjustable members 430-435 may be used such as hydraulic, pneumatic, or electronic risers. In addition, the number of such members may be selected as desired (e.g., to only control the vertical movement of coil 162 or to have additional control over the orientation or lateral position thereof). This may be a more viable approach because it can avoid adjusting the ride quality and aerodynamics when used in dynamic WPT with vehicles in motion.

Control over members 430-435 may be performed in much the same way as described above with respect to controlling the suspension of vehicle 160. Namely, the system may predict an optimal set of alignments for coils 162 and 164*b* (e.g., a gap that maximizes the power transfer) and, in turn, send control commands to SCU 457 to adjust members 430-435, accordingly.

Figure 6:
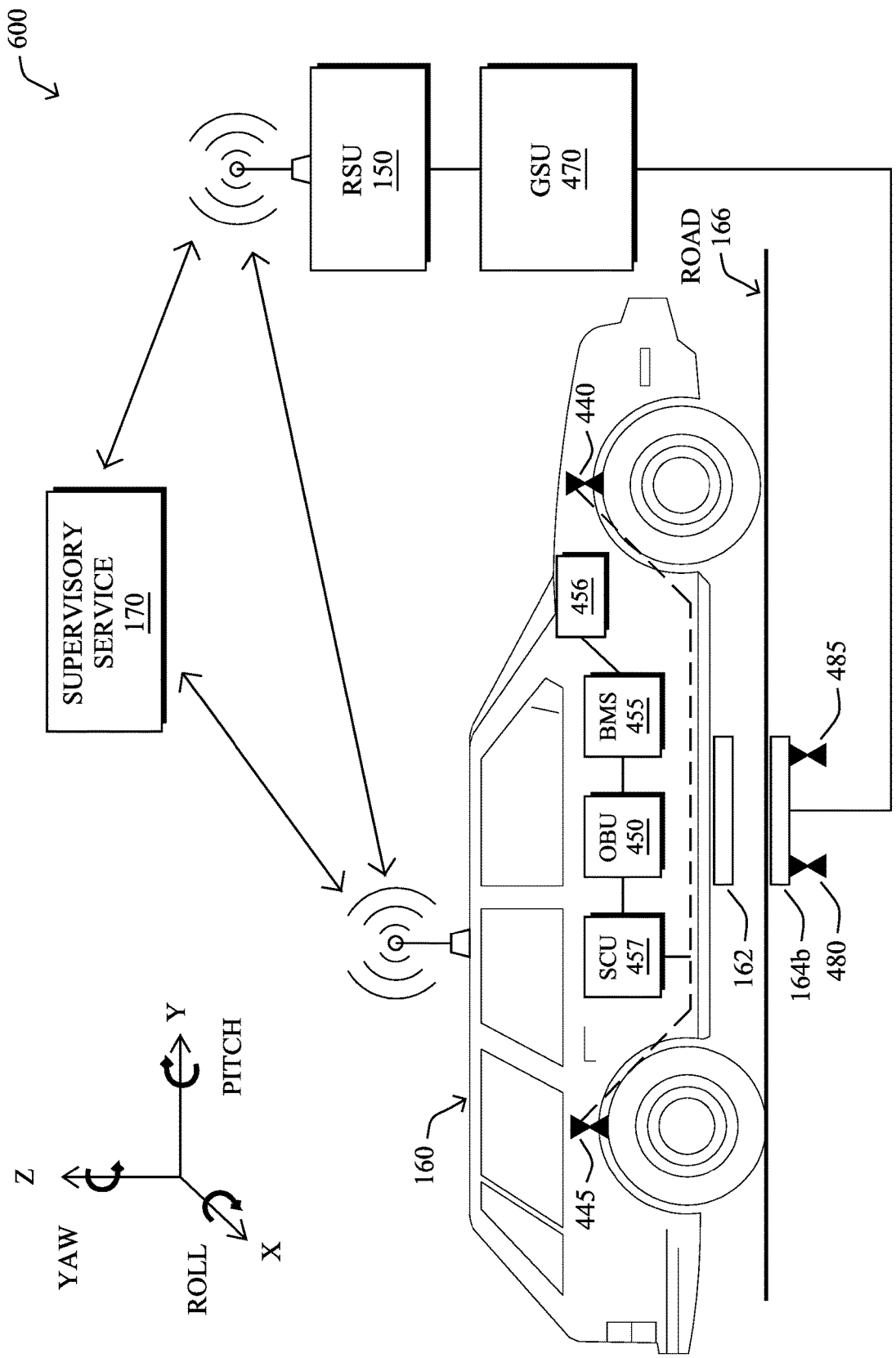
FIG. 6 illustrates an example of adjusting WPT ground-based charging coil orientation.

FIG. 6 illustrates yet another example of controlling the coil gap between a vehicle-based coil and a ground-based charging coil. In yet further embodiments of the techniques herein, the gap adjustment system may comprise adjustable members 480-485 coupled to ground-based charging coil 164*b*. Similar to the adjustable members 430-435 described above with respect to vehicle-based charging coil 162, adjustable members 480-485 may be hydraulic, pneumatic, or electronic risers that the WPT system can control, to adjust the orientation of coil 164*b*.

Notably, if the orientation(s) of coils 162 and 164*b* are sensed (e.g., in conjunction with the reported charging metrics from BMS 456), the WPT system may determine whether any height and/or planarity adjustments need to be made to ground-based charging coil 164*b*, to effect the optimal coil gap with vehicle-based charging coil 162. In turn, GCU 470 may send the corresponding control commands to members 480-485, to raise or lower ground-based charging coil 164*b* (and/or adjust the orientation of coil 164*b* by differentially activating the members at different corners), accordingly.

In further embodiments, the adjustment mechanisms described above can also be implemented in conjunction with one another. For example, as shown in FIG. 6, vehicle 160 may also be equipped with an SCU 457 and adjustable members 430-435 that are part of the suspension of vehicle 160. In another example, vehicle-based charging coil 162 may be equipped individually with adjustable members 430-435 and ground-based charging coil 164*b* may also be equipped with adjustable members 480-485. When multiple options are available to adjust the coil orientations, the system may select one of the methods (e.g., by only adjusting the height of coil 164*b*) or may opt to take a hybrid approach by controlling both systems (e.g., by lowering vehicle 160 and raising coil 164*b*, to effectuate the desired coil orientations relative to one another).

As would be appreciated, actuators such as adjustable members 480-485 mounted to the primary/ground-based charging coil 164*b*, adjustable members 430-435 mounted to the secondary/vehicle-based coil 162, and/or adjustable suspension components 440-445 of vehicle 160, may be mounted so as to allow for control over the orientation of coils 162 and/or 164*b* in three dimensions (3-D), in various embodiments. More specifically, members 480-485, 430-435, and/or suspension components 440-445 may be located and configured to adjust any or all of the following parameters with respect to coil 162 and/or 164*b*:

The x-axis position of the coil
The y-axis position of the coil
The z-axis position of the coil
The roll of the coil (e.g., about the x-axis)
The pitch of the coil (e.g., about the y-axis)
The yaw of the coil (e.g., about the z-axis)

For example, actuation of members suspension components 440-445 on only the passenger side of vehicle 160 can be used to adjust the pitch of coil 162.

One preferred embodiment uses a linear actuator to move the primary coil left-right in the vehicle lane, uses the driven position of the vehicle to adjust the front-back position of the secondary coil, and uses the vehicle's suspension components to adjust the coil separation and co-planarity in the pitch and roll axis, thus providing fine adjustments on the most important five degrees of freedom for coil alignment.

Figure 7A:
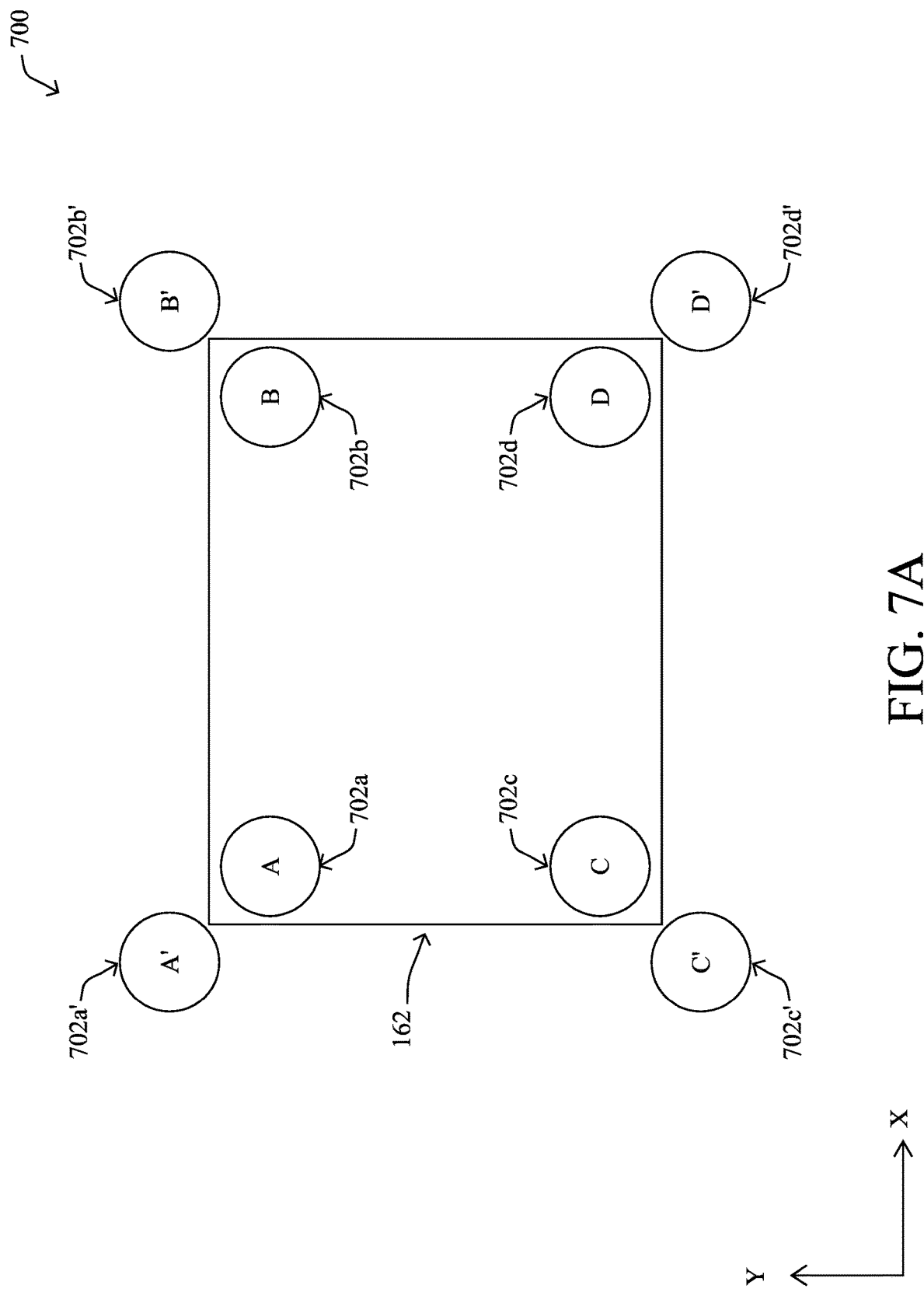
FIGS. 7A-7D illustrate examples of detecting coil misalignment using inductive sensors.

FIGS. 7A-7D illustrate examples of detecting coil misalignment using inductive sensors, according to various embodiments. As shown in FIG. 7A, one potential way to detect the misalignment of charging coils 162 and 164 is through the use of auxiliary coils 702. In FIG. 7A, the primary and secondary coils 164 (not shown) and 162 are perfectly aligned (e.g., coil 164 is perfectly beneath coil 162). Small auxiliary coils 702*a*, 702*b*, 702*c*, 702*d* and 702*a'*, 702*b'*, 702*c'*, and 702*d'* may be mounted adjacent to the secondary coil 162. Thus, whenever primary coil 164 (located below coil 162) is excited, it will induce voltages in the auxiliary coils 702. As would be appreciated, coils 162 and 164 may be circular in shape, rectangular in shape, or be of any other suitable shape.

In various embodiments, by analyzing the different voltages or phases induced in auxiliary coils 702, and also the differential voltages between adjacent coils 702, the WPT system can predict misalignment between coils 162 and 164. In turn, the analyzing device (e.g., a controller or supervisory device) can determine what adjustments need to be made in terms of translation, rotation, etc. between the two coils, to optimize their coupling.

To further understand the operation of the system, assume that $V_a$ is the voltage induced in auxiliary coil 702*a*, $V_{a'}$ is the voltage induced in auxiliary coil 702*a'*, $V_{aa'}$ is the differential voltage induced in coils 702*a* and 702*a'*, $V_b$ is the voltage induced in auxiliary coil 702*b*, $V_{b'}$ is the voltage induced in auxiliary coil 702b', $V_{bb'}$ is the differential voltage induced in coils 702b and 702b', etc. In the perfect alignment case shown in FIG. 7A, $V_{aa'}=V_{bb'}=V_{cc'}=V_{dd'}$ and $V_a>V_{a'}$, $V_b>V_{b'}$, $V_c>V_{c'}$, $V_d>V_{d'}$. In particular, in the perfect alignment case, the flux is largely contained between the primary and secondary coils, so the 702 sensor coils will see a bigger signal in comparison to the 702' sensor coils.

Figure 7B:
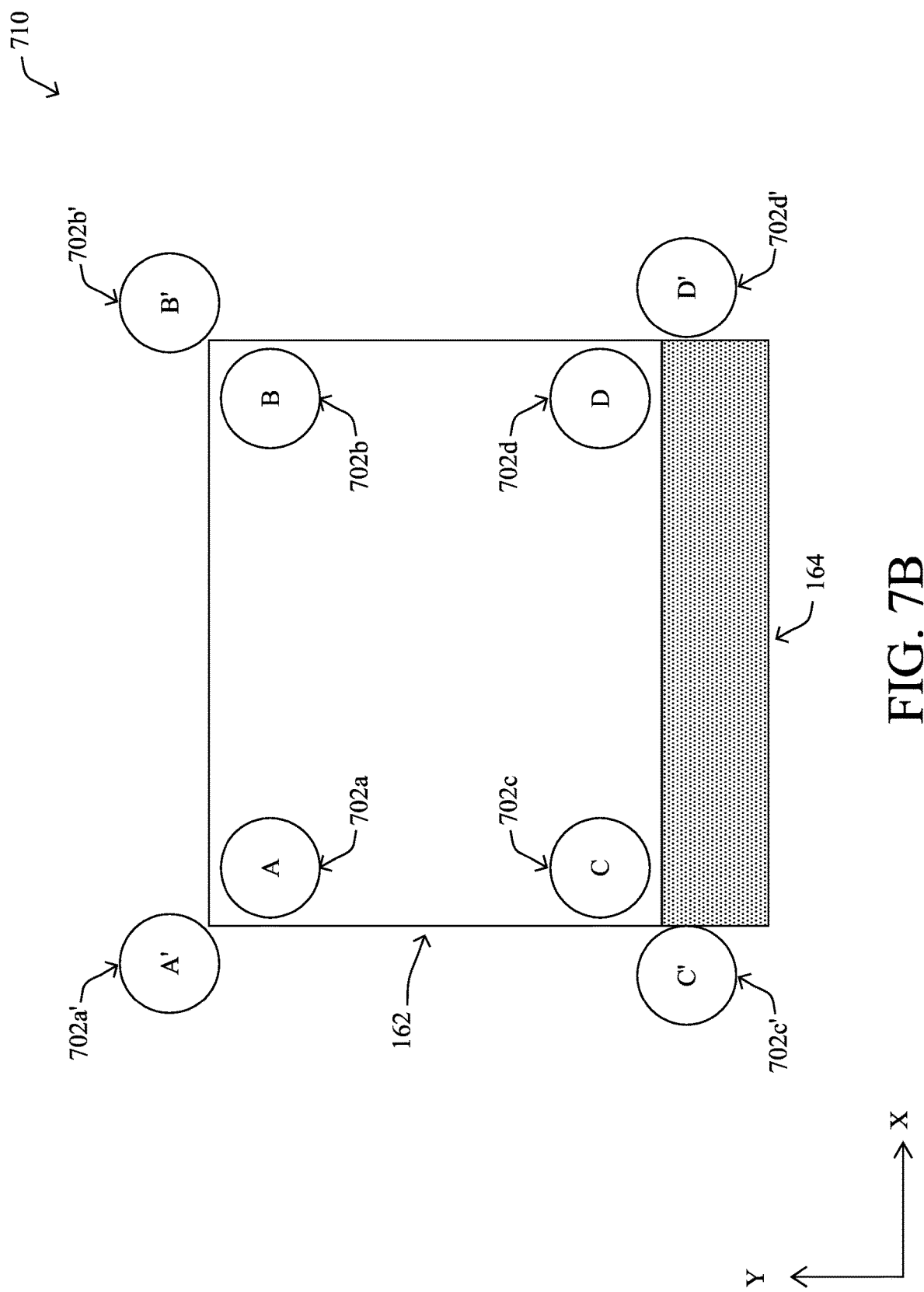

Referring now to FIG. 7B, to determine the alignment of coils 162 and 164 via auxiliary coils 702, the WPT system may perform the following:
- In the beginning, the alignment controller (e.g., SCU 457, supervisory service 170, or another device local or remote to vehicle 160 in FIGS. 5-6) instructs the charging controller to send a smaller burst of power to the primary coil 164. Note that the two controllers may be implemented as separate devices or on the same device, in various cases.
- The charging controller sends these bursts through the primary coil 164 by turning it on momentarily.
- These bursts are received by the auxiliary coils 702, which are sensed by the auxiliary coil logic.
- Various readings obtained by the auxiliary coils 702 are sent by the OBU to the RSU (e.g., from OBU 450 to RSU 150 in FIGS. 5-6).
- The RSU receives these readings and forwards them to the alignment controller.
- The alignment controller can analyze these readings and instruct the vehicle the required correction. This analysis can employ machine learning techniques, in some embodiments. Note that the correction could be carried out by the driver or the autonomous vehicle software and can entail moving the entire vehicle, or only actuators that adjust the relative position and angle of the secondary coil 162 under the vehicle or the primary coil 164.
- Any of the above steps can be repeated until the desired coil alignment is achieved.
- Once the desired alignment is achieved, the alignment controller can let the charging controller take over to begin charging.

In further embodiments, the above approach can also be applied to detecting the orientation of charging coil 164 and modifying the above steps to adjust the orientation of coil 164. For example, if coil 164 is mounted onto a robot, the alignment controller can directly instruct the robot to move, accordingly. In further cases, the misalignment sensing and adjustments may be made on both of coils 160 and 164.

By way of example, in FIG. 7B, assume that the primary/ground-based charging coil 164 is misaligned with secondary/vehicle-based coil 162 along the y-axis. In such a case, detection of the misalignment can be achieved through analysis of the induced voltages at auxiliary sensors 702. Notably, in the case shown, $V_a=V_{a'}=0$ (or very low), $V_b=V_{b'}=0$ (or very low), $(V_{aa'}, V_{bb'})<<(V_{cc'}, V_{dd'})$, and $V_{cc'}=V_{dd'}$. Thus, by sensing these conditions, the device overseeing the orientation of coil 162 and/or 164 can determine that there is a misalignment along the y-axis and determine an appropriate correction. For example, the magnitude by which $(V_{aa'}, V_{bb'})<<(V_{cc'}, V_{dd'})$ may be used to determine the amount of adjustment along the y-axis. As would be appreciated, a similar approach can be taken to identify misalignment along the x-axis, as well.

Figure 7C:
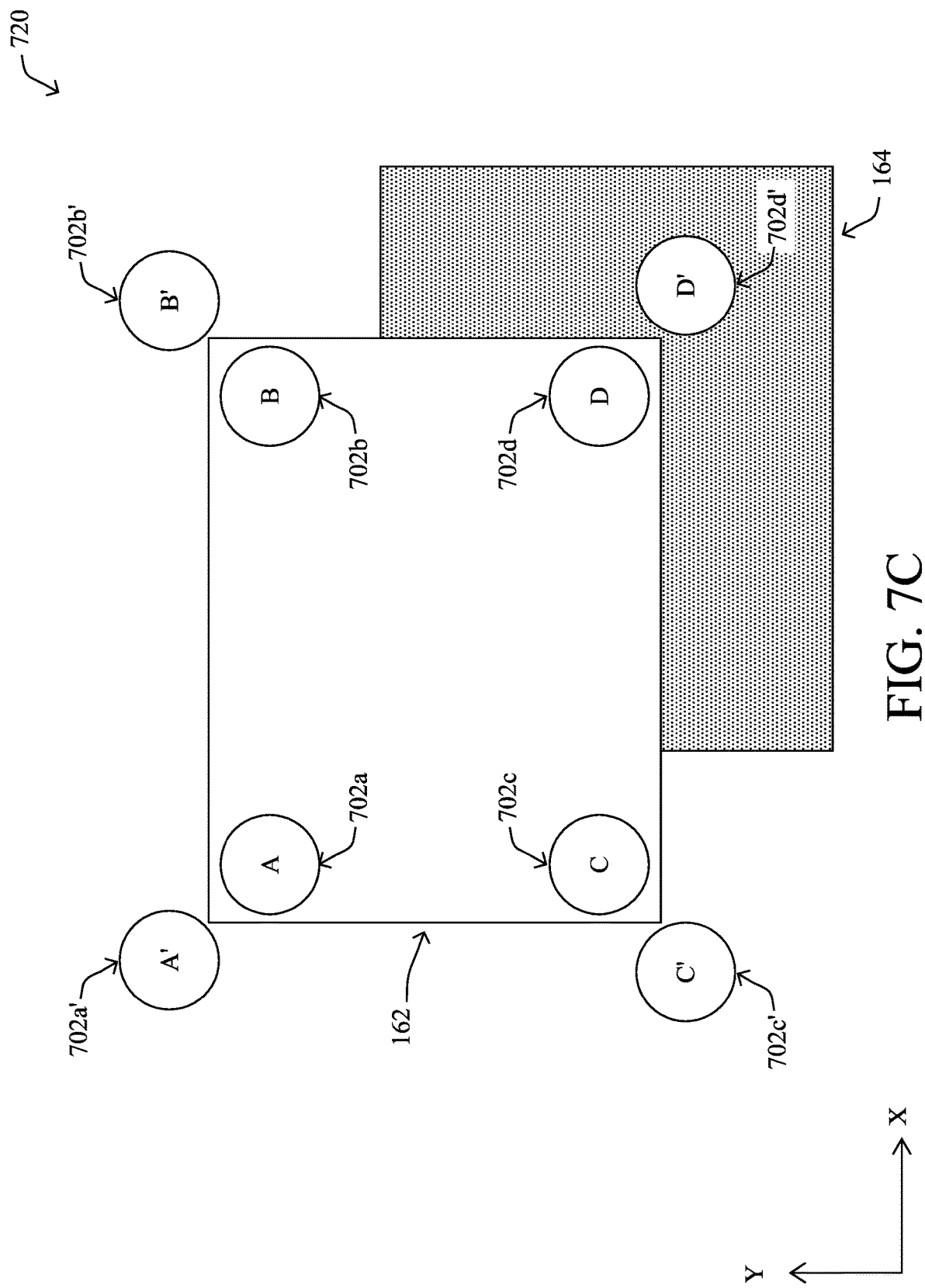

FIG. 7C illustrates another example of coil misalignment, but this time with coils 162 and 164 are misaligned in both the x- and y-dimensions. In such a case, detection of the misalignment can again be achieved through analysis of the induced voltages at auxiliary sensors 702. Notably, in the case shown, $V_a=V_{a'}=0$ (or very low), $V_b=V_{b'}=0$ (or very low), $V_c=V_{c'}=0$ (or very low), and $(V_{aa'}, V_{bb'}, V_{cc'})<<(V_{dd'})$.

Figure 7D:
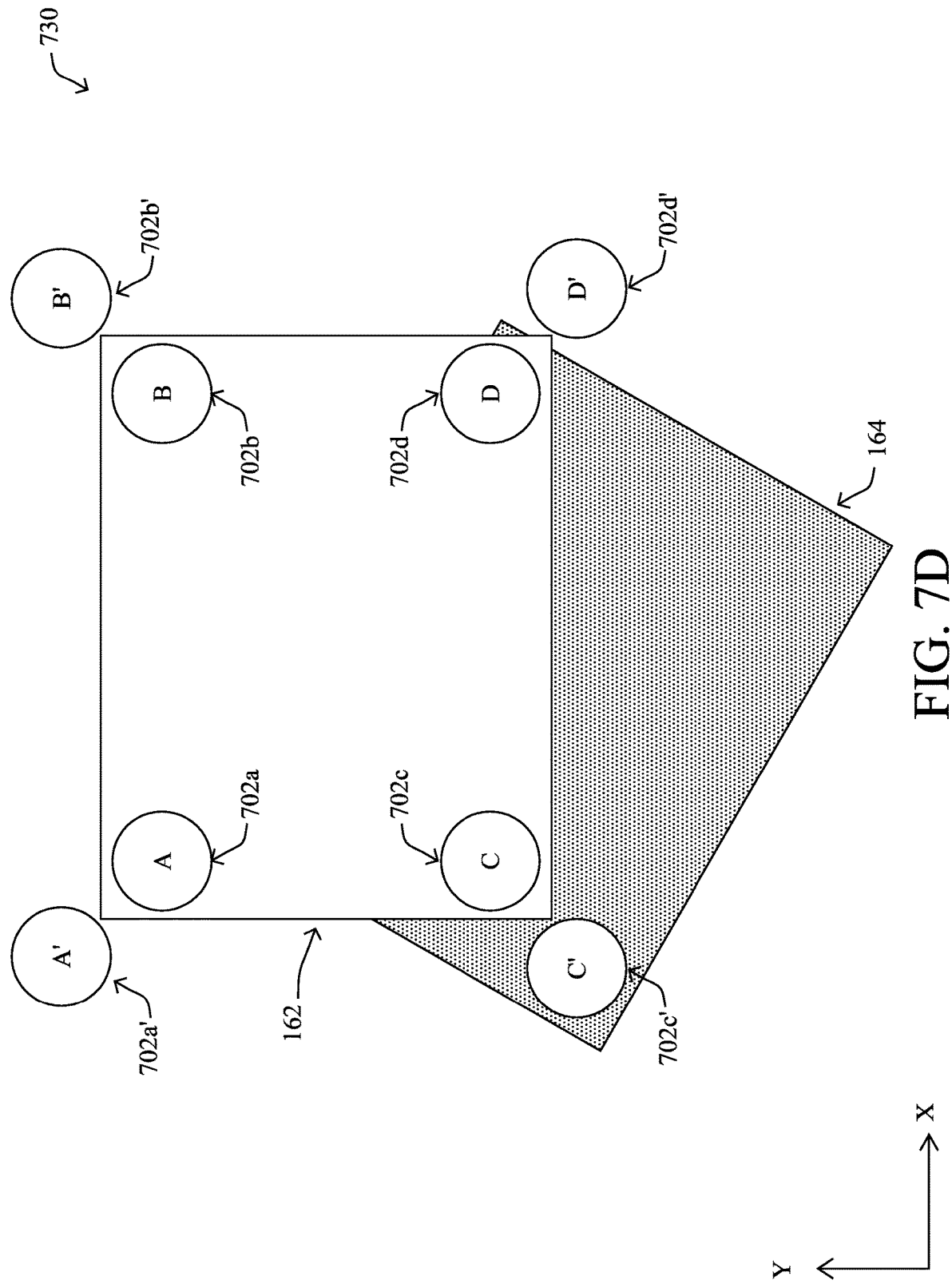

FIG. 7D illustrates yet another example of coil misalignment that auxiliary coils 702 can detect. As shown, the misalignment can be detected according to the following: $V_a=V_{a'}=0$ (or very low), $V_b=V_{b'}=0$ (or very low), $V_c=V_{c'}=$high, $V_{cc'}=0$, and $(V_{aa'}, V_{bb'})<<(V_{dd'})$.

Similar to misalignment in the X and Y directions, the misalignment in the Z direction can affect the efficiency. This type of misalignment implies that the faces of the two coils 162, 164 are not parallel to each other and leads to two issues. First, this type of misalignment can cause a larger than optimal air gap. The second issue is that, when the two coils are not exactly parallel, the electromagnetic coupling is suboptimal, resulting in further loss of efficiency. Thus, there are a number of degrees of freedom of possible misalignment between the primary and secondary coil. Notably, there is pitch (where there is a relative tilt front-to-back), roll (where there is a relative tilt left to right), and yaw (where there is a relative rotation about the Z axis, which is not too big of a deal for round coils, but for rectangular coils it can strongly impact coupling efficiency).

Knowledge of the electrical field using the planarity and distance information can also be applied to calibrate the expected voltages in the auxiliary coils 702, in some embodiments. This is crucial information that can improve X and Y alignment significantly because the variations experienced in the coils can be normalized against the reference of uneven electrical field. Since the system depends on minute variations of electrical voltages developed across these auxiliary coils to guide the alignment, any variation introduced by uneven planarity and distance needs to be normalized so that it does not mislead the system in interpreting these variations as misalignment in X and Y direction. The machine learning based analysis of all eight auxiliary coil waveforms may determine the degree of misalignment in all six degrees of freedom, in some embodiments.

Figure 8:
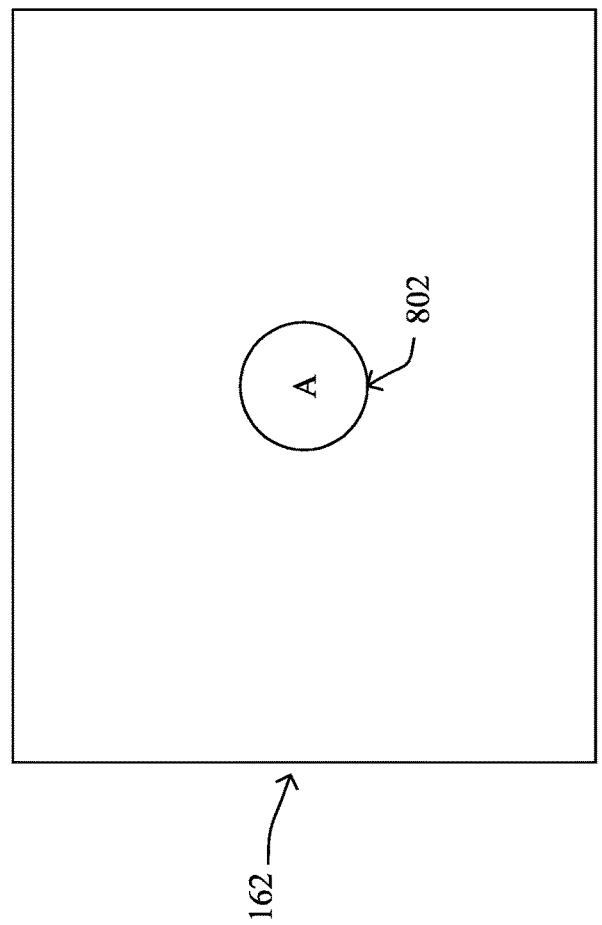
FIG. 8 illustrates an example of detecting coil misalignment using a gyroscopic sensor.

FIG. 8 illustrates an example 800 of detecting coil misalignment using a gyroscopic sensor, in further embodiments. As shown, a gyroscopic sensor 802 can be located on a charging coils, such as coil 162 and/or the ground-based coil. Such a sensor 802 may be configured to sense the yaw, pitch, and roll of coil 162 (and/or positions along the x, y, and/or z-axis). In turn, the WPT system can compare these measurements to those of the other coil (e.g., ground-based coil 164), to determine whether any misalignment exists and, if so, the appropriate corrections to the coil(s). Ground based coils 164, especially those permanently attached to the pavement, could have their inertial measurements surveyed infrequently, and looked up from a database for comparison with readings from vehicle mounted gyroscopic sensor 802.

Figure 9:
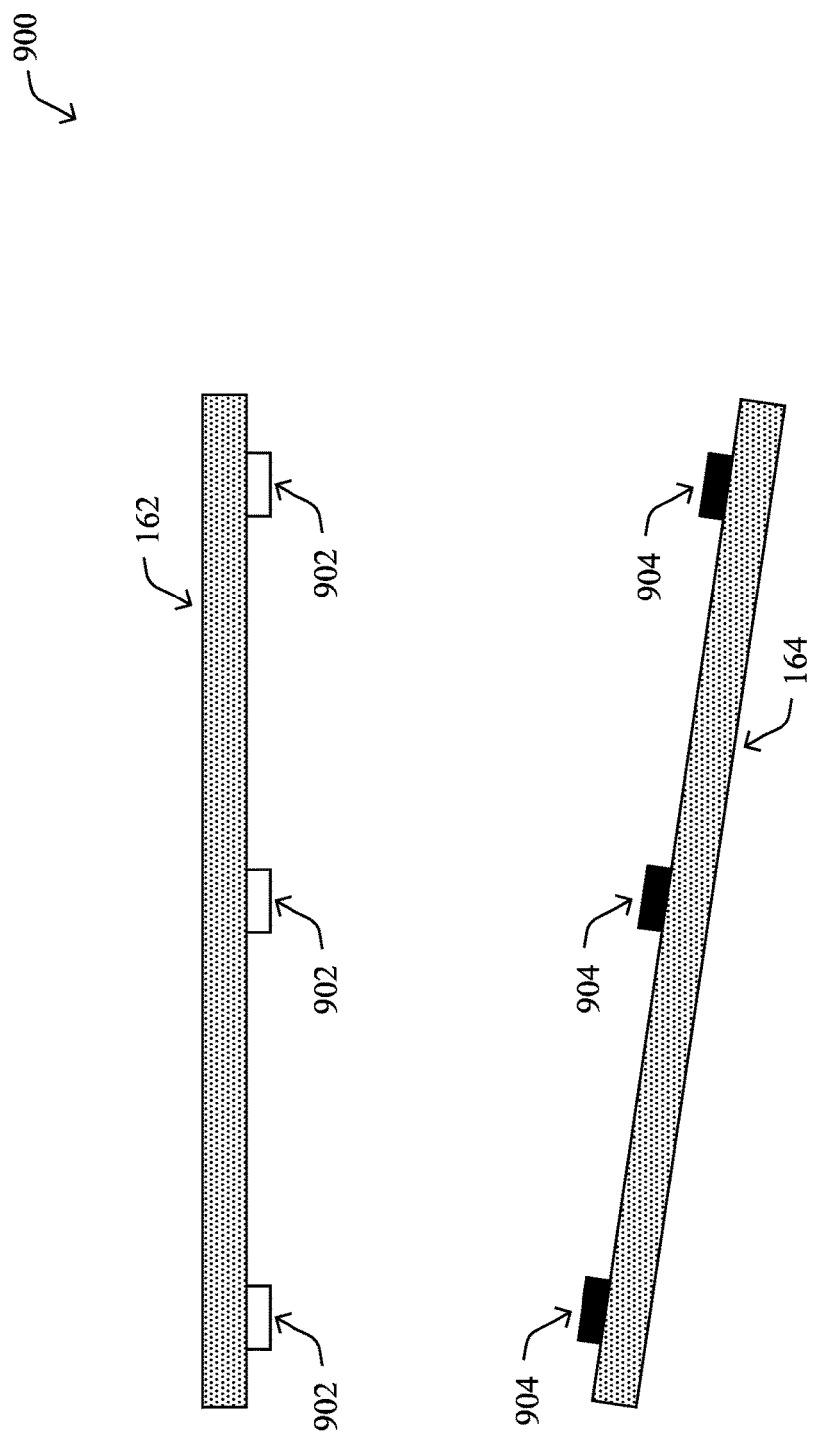
FIG. 9 illustrates an example of detecting coil misalignment using optical sensors.

FIG. 9 illustrates an example 900 of detecting coil misalignment using optical sensors, in another embodiment. As shown, any number of optical sensors 902 may be located on coil 162 and/or on coil 164 (e.g., on the four corners of coil 162, etc.). During operation, sensors 902 may detect fiducials 904 on the opposing coil, such as on the surface of primary coil 164. In turn, various 3-D triangulation approaches can be used to estimate the orientations and misalignment of coils 162, 164 and determine the appropriate corrections to the orientations of coil 162 and/or 164. These corrections would then be applied to the control processes described above.

Figure 10:
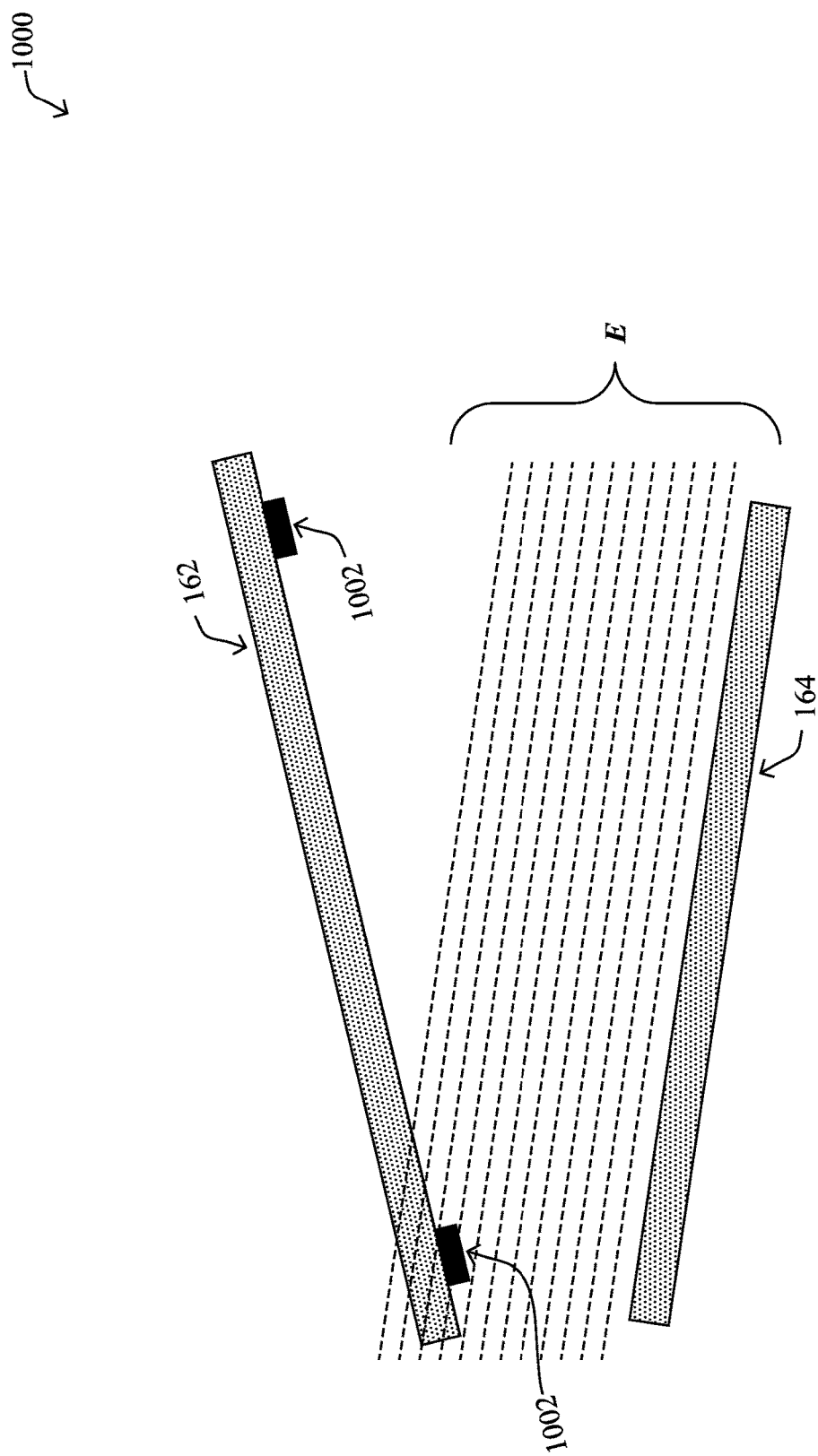
FIG. 10 illustrates an example of detecting coil misalignment using sonic sensors.

FIG. 10 illustrates yet another example 1000 of detecting coil misalignment using sonic sensors, in another embodiment. As shown, sonic sensors 1002 may be located on coil 162 and/or coil 164, to detect the relative distances between sensors 1002 and the opposing coil. Based on the detected distances, the system can determine the appropriate orientation corrections, to align coils 162 and 164.

The techniques herein can further help automatic adjustment systems that try to converge on optimal transfer efficiency. Notably, by using the planarity and gap information, the system can predict the precise electrical field (E) as encountered by the secondary coil 162, as shown. By using this knowledge, the system can re-estimate the possible optimum efficiency number, as opposed to a theoretical optimum efficiency number. This will help the system converge rapidly on an efficiency very close to the practical maximum, rather than oscillating back and forth trying to find an unachievable theoretical goal.

In further embodiments, special sensors may not be required to determine the planarity and alignment of the charging coils. Instead, position and inertial sensors of the vehicle, as well as precision surveys of the locations and orientations of the ground-based coils, can be used to determine the appropriate coil orientation correction(s). For example, assume that the pitch, yaw, and roll angles of the ground-based coil are known within a few degrees and its location is also known within a few centimeters. In such cases, this information can be made available via a public database and the GPS system and accelerometers of the vehicle can be used to determine the alignment.

Figure 11:
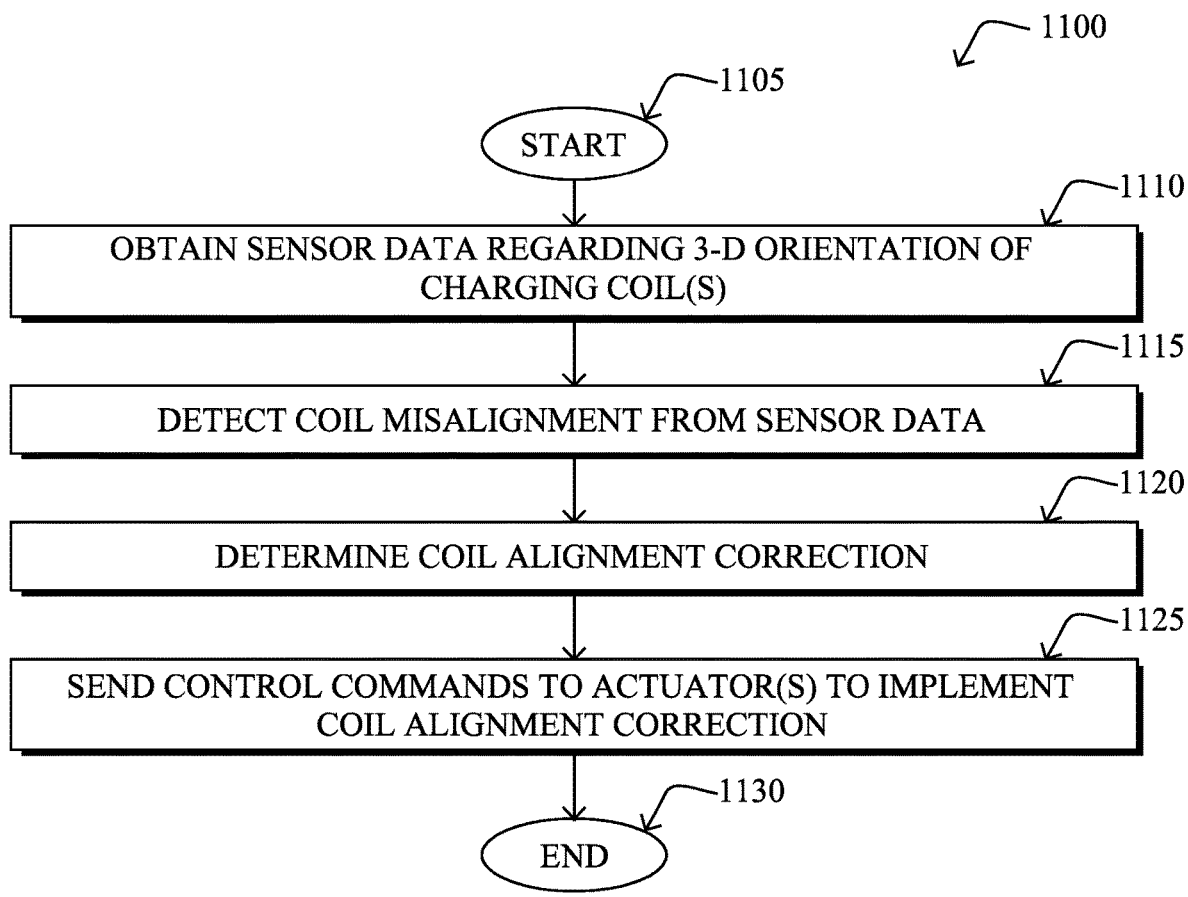
FIG. 11 illustrates an example simplified procedure for adjusting coil alignment in a WPT charging system.

FIG. 11 illustrates an example simplified procedure for adjusting coil alignment in a WPT charging system, in accordance with one or more embodiments described herein. For example, a non-generic, specifically configured device (e.g., device 200) may perform procedure 1100 by executing stored instructions (e.g., process 248). The procedure 1100 may start at step 1105, and continues to step 1110, where, as described in greater detail above, the device may obtain sensor data indicative of three dimensional (3-D) orientations of primary and secondary wireless power transfer (WPT) charging coils. For example, the sensor data may be indicative of any or all of: the x, y, and/or z-axis position of the coil, the yaw of the coil, the pitch of the coil, or the roll of the coil. In some embodiments, the secondary coil is mounted to a vehicle and the primary coil provides charge to the secondary coil during charging. According to various embodiments, the sensor data may be obtained from any or all of the following: gyroscopic sensor(s) mounted on the primary and/or secondary coil, optical sensors mounted on the primary and/or secondary coil, (ultra)sonic sensors mounted on the primary and/or secondary coil, or auxiliary coils on or next to the secondary coil that sense induction caused by powering of the primary coil.

At step 1115, as detailed above, the device may detect misalignment between the primary and secondary WPT coils based on the sensor data with up to six degrees of freedom. Depending on the type of sensor data, the device may take any number of different approaches. For example, in the case of optical sensors, the device may assess where fiducials on the opposing coil appear in the field of view of the optical sensors, to detect coil misalignment. In the case of (ultra)sonic sensors, detection of misalignment may entail determining whether the distances sensed by multiple transducers between the coils are equal to one another. In the case in which the sensors are auxiliary coil sensors, differences in the induced voltages among the auxiliary coils can be used to detect coil misalignment. In yet another example, gyroscopic measurements can be used to determine whether the primary and secondary coils are aligned in three dimensions.

At step 1120, the device may determine a coil alignment correction to offset the detected misalignment, as described in greater detail above. In particular, the primary and/or secondary coil may be coupled via a control system to actuators that can be used to adjust the yaw, roll, and pitch of the coil. Such actuators may be mounted directly to the primary and/or secondary coil or, in the case of the secondary/vehicle-based coil, be part of the suspension system of the vehicle. Depending on the actuators in use, the device may decide to adjust the x-axis position, the y-axis position, the z-axis position, the yaw, the roll, and/or the pitch of either or both coils, in an attempt to bring the coils into their optimal alignment and orientations, so as to maximize the amount of power transferred from the primary coil to the secondary coil.

At step 1125, as detailed above, the device may send control commands to the one or more actuators of the primary and/or secondary coil, to implement the coil alignment correction. In some cases, the system may iteratively repeat steps 1110-1125, to ensure that the coils have achieved their desired or best possible orientations relative to one another. Once this condition has been achieved, the system may then signal the primary coil to begin the wireless power transfer to the secondary coil of the vehicle. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for optimization of the alignment of WPT coils, so as to maximize the power transfer between the two. In some aspects, the techniques herein are particularly well suited for square or rectangular shaped coils, whose orientations can be adjusted in any of three different dimensions (e.g., by adjusting the yaw, pitch, and roll of the coil). Note that in the case of round coils, one of these (e.g., the yaw of the coil) would be invariant, but can be quite important in the case of quadrilateral shaped coils. By controlling all six degrees of freedom of alignment between the primary and secondary coils, this allows for better pairing of the coils during charging, which can improve efficiency and reduce wasted energy.

In further aspects, the techniques herein can also leverage sensor fusion between inductive, optical, acoustic, gyroscopic, and/or dead reckoning sensor modes, to precisely determine coil misalignment in all six degrees of freedom. In addition, the control system can also monitor the power level from the secondary coil, and dynamically perform fine tuning (for example, millimeter level adjustments of Z-Axis inter-coil gap) to optimize the total power transfer level for each specific set of coil-coil conditions. In addition, it can also monitor primary coil input power levels, perform some primary/secondary power ratio calculations, and move the actuators to optimize power transfer efficiency, which may not be exactly the same as maximizing total power transfer levels). Some machine learning techniques can also be leveraged, to determine how to move the actuators to achieve these optimizations.

While there have been shown and described illustrative embodiments that provide for precision coil alignment techniques for wireless power transfer to a vehicle, it is to be understood that various other adaptations and modifications may be made within the spirit and scope of the embodiments herein. For example, while certain embodiments are described herein with respect to WPT charging of a vehicle, the techniques can also be applied to non-vehicle cases, whereby the orientation of one or both coils can be controlled.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    obtaining, by a supervisory service in communication with a road side unit (RSU), sensor data indicative of three dimensional (3-D) orientations of primary and secondary wireless power transfer (WPT) charging coils, wherein the secondary coil is mounted to a vehicle and the primary coil is connected to the RSU and provides charge to the secondary coil during charging, further wherein the supervisory service is located in a cloud layer and in communication with a plurality of RSUs;
    detecting, by the supervisory service, misalignment between the primary and secondary WPT coils based on the sensor data;
    determining, by the supervisory service and based on a machine-learning based process that is trained to optimize power transfer of charge between the primary coil and the secondary coil, a coil alignment correction to offset the detected misalignment, wherein the machine-learning based process is located in the cloud layer and predicts one or more coil orientations that optimize the power transfer by modeling previous power transfers to the vehicle or other vehicles of its kind; and
    sending, by the supervisory service, control commands to one or more actuators to implement the coil alignment correction by moving one or more of the coils.

2. The method as in claim 1, wherein the sensor data is indicative of at least one of: pitch, yaw, or roll of each of the coils.

3. The method as in claim 1, wherein obtaining the sensor data indicative of the 3-D orientations of the primary and secondary WPT charging coils comprises:
    receiving the sensor data from gyroscopic sensors mounted on the primary and secondary WPT charging coils.

4. The method as in claim 1, wherein obtaining the sensor data indicative of the 3-D orientations of the primary and secondary WPT charging coils comprises:
    receiving the sensor data from ultrasonic or optical sensors mounted to the secondary WPT charging coil.

5. The method as in claim 1, wherein obtaining the sensor data indicative of the 3-D orientations of the primary and secondary WPT charging coils comprises:
    receiving sensed induction from one or more sensing coils mounted on or next to the secondary WPT charging coil that is induced by the primary WPT charging coil.

6. The method as in claim 5, wherein the primary WPT charging coil is powered momentarily in a burst to induce the one or more sensing coils and prior to implementation of the coil alignment correction.

7. The method as in claim 5, wherein determining the coil alignment correction comprises:
    comparing measured voltages of two or more sensing coils.

8. The method as in claim 1, wherein the primary WPT charging coil is mounted to a robot.

9. The method as in claim 1, wherein the one or more actuators are mounted to corners of the secondary WPT charging coil.

10. The method as in claim 1, further comprising:
    determining that the primary and secondary coils are aligned; and
    sending a signal that causes the primary coil to begin providing charge to the secondary coil, based on the determination that the primary and secondary coils are aligned.

11. An apparatus, comprising:
    one or more network interfaces to communicate with a wireless power transfer (WPT) system for a vehicle that comprises primary and secondary charging coils, wherein the secondary coil is mounted to a vehicle and the primary coil is connected to a road side unit (RSU) and provides charge to the secondary coil during charging;
    a processor coupled to the network interfaces and configured to execute one or more processes; and
    a memory configured to store a process executable by the processor, the process when executed configured to:
    obtain, by supervisory service in communication with the RSU, sensor data indicative of three dimensional (3-D) orientations of the primary and secondary charging coils, further wherein the supervisory service is located in a cloud layer and in communication with a plurality of RSUs;
    detect misalignment between the primary and secondary charging coils based on the sensor data;
    determine, based on a machine-learning based process that is trained to optimize power transfer of charge between the primary coil and the secondary coil, a coil alignment correction to offset the detected misalignment, wherein the machine-learning based process is located in the cloud layer and predicts one or more coil orientations that optimize the power transfer by modeling previous power transfers to the vehicle or other vehicles of its kind; and
    send control commands to one or more actuators to implement the coil alignment correction by moving one or more of the coils.

12. The apparatus as in claim 11, wherein the sensor data is indicative of at least one of: pitch, yaw, or roll of each of the coils.

13. The apparatus as in claim 11, wherein the apparatus obtains the sensor data indicative of the 3-D orientations of the primary and secondary WPT charging coils by:
    receiving the sensor data from gyroscopic sensors mounted on the primary and secondary WPT charging coils.

14. The apparatus as in claim 11, wherein the apparatus obtains the sensor data indicative of the 3-D orientations of the primary and secondary WPT charging coils by:

receiving the sensor data from ultrasonic sensors mounted to the secondary WPT charging coil.

15. The apparatus as in claim 11, wherein the apparatus obtains the sensor data indicative of the 3-D orientations of the primary and secondary WPT charging coils by:
receiving sensed induction from one or more sensing coils mounted on or next to the secondary WPT charging coil that is induced by the primary WPT charging coil.

16. The apparatus as in claim 11, wherein the apparatus obtains the sensor data indicative of the 3-D orientations of the primary and secondary WPT charging coils by:
receiving the sensor data from optical sensors mounted on the secondary WPT charging coil.

17. The apparatus as in claim 11, wherein the primary WPT charging coil is mounted to a robot.

18. The apparatus as in claim 11, wherein the one or more actuators are mounted to corners of the secondary WPT charging coils.

19. The apparatus as in claim 11, wherein the process when executed is further configured to:
determine that the primary and secondary coils are aligned; and
send a signal that causes the primary coil to begin providing charge to the secondary coil, based on the determination that the primary and secondary coils are aligned.

20. A tangible, non-transitory, computer-readable medium storing program instructions that cause a supervisory service in communication with a road side unit (RSU) to perform a process, comprising:
obtaining, by the supervisory service, sensor data indicative of three dimensional (3-D) orientations of primary and secondary wireless power transfer (WPT) charging coils, wherein the secondary coil is mounted to a vehicle and the primary coil is connected to the RSU and provides charge to the secondary coil during charging, further wherein the supervisory service is located in a cloud layer and in communication with a plurality of RSUs;
detecting, by the supervisory service, misalignment between the primary and secondary WPT coils based on the sensor data;
determining, by the supervisory service and based on a machine-learning based process that is trained to optimize power transfer of charge between the primary coil and the secondary coil, a coil alignment correction to offset the detected misalignment, wherein the machine-learning based process is located in the cloud layer and predicts one or more coil orientations that optimize the power transfer by modeling previous power transfers to the vehicle or other vehicles of its kind; and
sending, by the supervisory service, control commands to one or more actuators to implement the coil alignment correction by moving one or more of the coils.

* * * * *